United States Patent
Yu et al.

(10) Patent No.: US 10,859,709 B2
(45) Date of Patent: Dec. 8, 2020

(54) SATELLITE NAVIGATION RECEIVER WITH FIXED POINT SIGMA RHO FILTER

(71) Applicant: Deere & Company, Moline, IL (US)

(72) Inventors: Wei Yu, Torrance, CA (US); Richard G. Keegan, Palos Verdes Estates, CA (US); Ronald R. Hatch, Wilmington, CA (US)

(73) Assignee: DEERE & COMPANY, Moline, IL (US)

( * ) Notice: Subject to any disclaimer, the term of this patent is extended or adjusted under 35 U.S.C. 154(b) by 248 days.

(21) Appl. No.: 16/030,483

(22) Filed: Jul. 9, 2018

(65) Prior Publication Data

US 2018/0313958 A1 Nov. 1, 2018

Related U.S. Application Data

(63) Continuation of application No. 14/880,852, filed on Oct. 12, 2015, now Pat. No. 10,048,385.

(51) Int. Cl.
| | | |
|---|---|---|
| *G01S 19/29* | (2010.01) | |
| *G01S 19/36* | (2010.01) | |
| *G01S 19/30* | (2010.01) | |
| *G01S 19/37* | (2010.01) | |

(52) U.S. Cl.
CPC .............. *G01S 19/29* (2013.01); *G01S 19/36* (2013.01); *G01S 19/30* (2013.01); *G01S 19/37* (2013.01)

(58) Field of Classification Search
CPC .......... G01S 19/29; G01S 19/30; G01S 19/36; G01S 19/37

USPC ............. 342/357.68, 357.69, 357.76, 357.77
See application file for complete search history.

(56) References Cited

U.S. PATENT DOCUMENTS

| | | | |
|---|---|---|---|
| 5,621,416 A | 4/1997 | Lennen | |
| 6,493,378 B1 | 12/2002 | Zhodzishsky et al. | |
| 6,630,904 B2* | 10/2003 | Gustafson | G01C 21/165 342/357.59 |
| 6,952,440 B1 | 10/2005 | Underbrink | |
| 7,064,707 B2* | 6/2006 | Martin | G01S 19/21 342/357.59 |
| 7,151,486 B2* | 12/2006 | Kim | G01S 19/26 342/357.59 |
| 8,362,949 B2* | 1/2013 | Yang | G01S 19/49 342/357.31 |
| 8,364,401 B2* | 1/2013 | Da Silva | G01S 19/47 701/400 |

(Continued)

OTHER PUBLICATIONS

European Search Report issued in counterpart application No. 16855951.6 dated Sep. 11, 2019. (21 pages).

(Continued)

*Primary Examiner* — Chuong P Nguyen
(74) *Attorney, Agent, or Firm* — James P. Muraff; McDonald Hopkins LLC

(57) ABSTRACT

A multi-band satellite navigation receiver for carrier and code tracking using a fixed point sigma rho filter with improved stability is described. The receiver simplifies and speeds up the data processing in the filter to adaptively accommodate common information from aggregate bands and obtain the accurate position of the receiver in real time. The filter may utilize a standard deviation function and a cross correlation function while determining adaptive scale factors to ensure that the filter is stable and reliable.

16 Claims, 21 Drawing Sheets

(56) References Cited

U.S. PATENT DOCUMENTS

| | | | |
|---|---|---|---|
| 8,692,714 B2* | 4/2014 | Matsumoto | G01S 19/30 342/357.77 |
| 8,781,039 B2 | 7/2014 | Keegan | |
| 8,907,844 B2* | 12/2014 | Revol | G01S 19/22 342/357.72 |
| 9,048,964 B2 | 6/2015 | Keegan et al. | |
| 9,385,767 B2 | 7/2016 | Veitsel et al. | |
| 9,658,341 B2* | 5/2017 | Mathews | G01S 11/10 |
| 10,031,236 B2* | 7/2018 | Zhodzishsky | G01S 19/235 |
| 10,048,385 B2* | 8/2018 | Yu | G01S 19/29 |
| 10,281,584 B2* | 5/2019 | Turner | G01S 19/29 |
| 10,613,235 B2* | 4/2020 | Zhodzishsky | G01S 19/23 |
| 2002/0047799 A1 | 4/2002 | Gustafson et al. | |
| 2005/0147191 A1 | 7/2005 | Geier et al. | |
| 2006/0015250 A1 | 1/2006 | Kim | |
| 2009/0323793 A1 | 12/2009 | Chang et al. | |
| 2010/0211316 A1 | 8/2010 | Da Silva et al. | |
| 2010/0254439 A1* | 10/2010 | Martin | G01S 19/24 375/150 |
| 2011/0309978 A1 | 12/2011 | Matsumoto | |
| 2012/0326922 A1 | 12/2012 | Yang et al. | |
| 2012/0326926 A1 | 12/2012 | Vander Velde et al. | |
| 2014/0062781 A1 | 3/2014 | Mathews et al. | |
| 2016/0116599 A1 | 4/2016 | Turner et al. | |
| 2017/0261618 A1 | 9/2017 | Zhodzishsky et al. | |
| 2020/0271794 A1* | 8/2020 | Sleewaegen | G01S 19/24 |

OTHER PUBLICATIONS

Mohinder S. Grewal et al, Implementation Methods, Kalman Filtering : Theory and Practice with MATLAB, Nov. 21, 2014, pp. 281-365.

Barisic et al., "Sigma-Point Unscented Kalman Filter Used for AUV Navigation," *20th Mediterranean Conference on Control & Automation*, Jul. 3-6, 2012, pp. 1365-1372.

Barreau et al., "Kalman Filter Based Robust GNSS Signal Tracking Algorithm in Presence of Ionospheric Scintillations," *6th ESA Workshop on Satellite Navigation Technologies and European Workshop on GNSS Signals and Signal Processing, Institute of Electrical and Electronics Engineers (IEEE)*, Dec. 2012, pp. 1-8.

Grewal et al., "Kalman Filter Implementation With Improved Numerical Properties," *IEEE Transactions on Automatic Control*, Sep. 2010, pp. 2058-2068, vol. 55, No. 9.

Humphreys et al., "Modeling the Effects of Ionospheric Scintillation on GPS Carrier Phase Tracking," *IEEE Transactions on Aerospace and Electronic Systems*, Oct. 2010, pp. 1624-1637, vol. 46, No. 4.

Li et al., "High Dynamic Carrier Tracking Using Kalman Filter Aided Phase-Lock Loop," *International Conference on Wireless Communications, Networking and Mobile Computing, Institute of Electrical and Electronics Engineers (IEEE)*, 2007, pp. 673-676.

Petovello et al., "GNSS Solutions: What are vector tracking loops, and what are their benefits and drawbacks?," Inside GNSS, May/Jun. 2009, pp. 16-21.

Psiaki et al., "Extended Kalman Filter Methods for Tracking Weak GPS Signals," *ION GPS*, Sep. 24-27, 2002, pp. 2539-2553.

The United States Patent and Trademark Office, Notification of Transmittal of The International Search Report and The Written Opinion of The International Searching Authority, or The Declaration in International Application No. PCT/US16/54654 (dated Dec. 28, 2016).

Megahed et al., *GNSS 2009—Proceedings of The 22$^{nd}$ International Technical Meeting of The Satellite Division of The Institute of Navigation*, 2591-2601 (Sep. 25, 2009).

Yin et al., *GNSS 2014—Proceedings of The 27th International Technical Meeting of The Satellite Division of The Institute of Navigation*, 2747-2753 (Sep. 12, 2014).

European Patent Office, Supplementary Partial European Search Report in European Patent Application No. EP 16855951 (dated May 17, 2019).

* cited by examiner

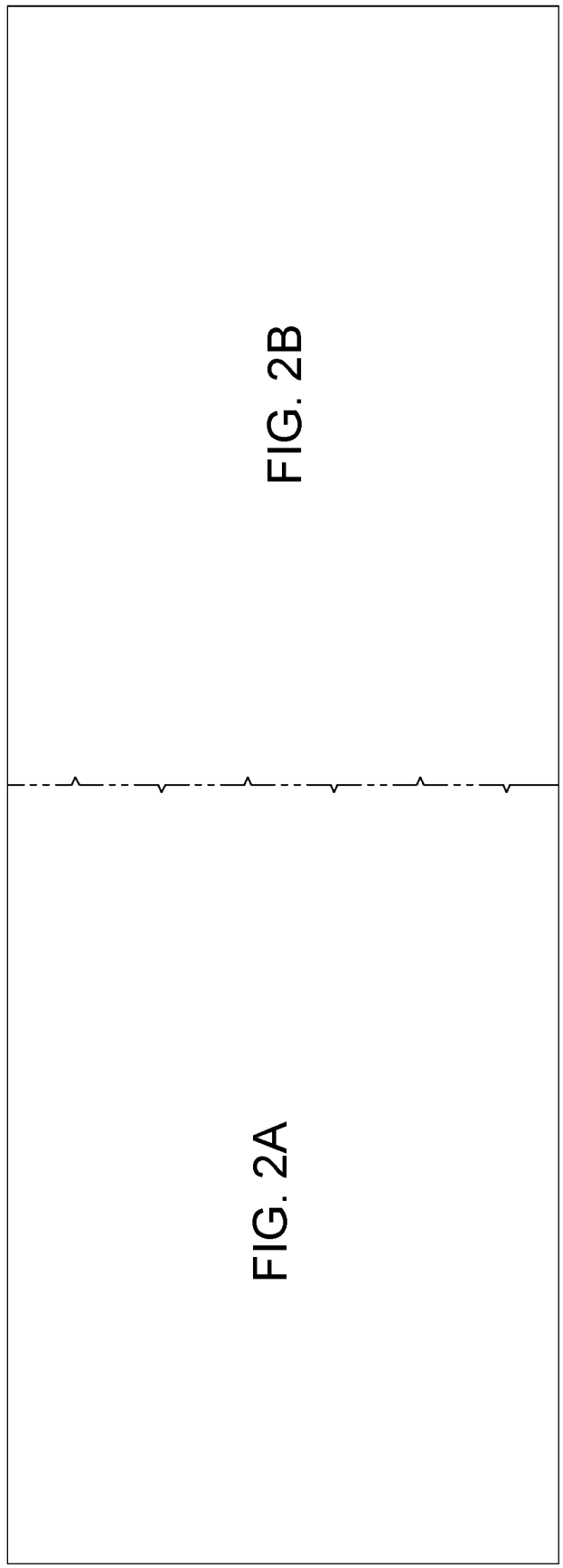

SATELLITE NAVIGATION RECEIVER WITH FIXED POINT SIGMA RHO FILTER

CROSS REFERENCE TO RELATED APPLICATION

This application is a continuation of U.S. patent application Ser. No. 14/880,852, filed on Oct. 12, 2015, which is hereby incorporated by reference in its entirety.

TECHNICAL FIELD

This application generally relates to a satellite navigation receiver with a fixed point sigma rho filter. In particular, this application relates to a multi-band satellite navigation receiver for carrier and code tracking using a fixed point sigma rho filter with improved stability.

BACKGROUND

Global navigation satellite systems (GNSS) utilize satellites to enable a receiver to determine position, velocity, and time with very high accuracy and precision using signals transmitted from the satellites. Such GNSS include the Global Positioning System (GPS), GLONASS, and Galileo. The signals transmitted from the satellites include one or more carrier signals at separate known frequencies, such as a first carrier (L1), a second carrier (L2), and an additional third carrier (L5) in the GPS. A code, such as a pseudo-random (PN) noise code modulated with information, may modulate a carrier of the signal, and may be unique to each satellite. Because the satellites have known orbital positions with respect to time, the signals can be used to estimate the relative position between an antenna of a receiver and each satellite, based on the propagation time of one or more signals received from three or more of the satellites. In particular, the receiver can synchronize a local replica of the carrier and code transmitted in a signal to estimate the relative position.

A typical receiver utilizes carrier tracking loops and code tracking loops for each satellite to measure the distance and velocity between the receiver and a particular satellite. The local replicas of the carrier and code can be generated by local signal generators that are driven by the carrier tracking loops and code tracking loops. In some receivers, extended Kalman filters (EKF) may be utilized to estimate the phase of the carrier and code through joint estimation. A conventional EKF can combine information from multiple frequencies to optimally estimate the distance and velocity between the receiver and a satellite. However, EKFs are not necessarily practical for use as aggregate predictive filters for carrier and code tracking due to the need to perform floating point calculations. For example, EKFs can have demanding or excessive computational requirements associated with minimizing the mean square error for data parameters with typical dynamic ranges associated with signal processing in satellite navigation receivers. In addition, EKF filters for signal processing may require the computation of inverse matrices with the complexity of $O(n^3)$, where n is the dimension of the matrices. This fast iteration requirement prevents EKFs with complicated matrices calculations from using real-time signal processing.

One alternative representation of an EKF is a sigma rho filter. A sigma rho filter may also be utilized in some receivers to estimate the phase of the carrier and code. Sigma rho filters can use a standard deviation term (e.g., sigma parameter) and a cross correlation term (e.g., rho parameter), instead of a covariance matrix as in a typical EKF. The use of a standard deviation term can reduce the numerical range, and result in the saving of logic gates and/or the lowering of requirements for the widths of registers. The use of a cross correlation term naturally guarantees the symmetric property of the covariance matrix, in contrast to a typical EKF which uses a covariance matrix that requires an additional symmetric check. However, sigma rho filters using floating point calculations may be difficult to implement using digital circuits and may have issues with reliability and stability without special treatment, such as the possibility that the cross correlation term may not be properly bounded during the dynamic propagation and/or the measurement update of the sigma rho filter.

Accordingly, there is an opportunity for a satellite navigation receiver that addresses these concerns. More particularly, there is an opportunity for a satellite navigation receiver that simplifies and speeds up the data processing in a stable multi-band predictive filter for carrier tracking and code tracking to adaptively accommodate common information from aggregate bands and obtain the accurate position of a receiver in real time.

SUMMARY

The satellite navigation receiver described herein includes a receiver front end, an analog-to-digital converter, a plurality of signal generators, a plurality of receiver modules, and an aggregate predictive filter. The receiver front end may be for down-converting a composite received signal comprising a plurality of carrier signals, and the analog-to-digital converter may be for converting the down-converted composite received signal to a digital composite received signal. The plurality of signal generators may each be for generating a local reference carrier signal and a local reference ranging code based on carrier corrective control data and code corrective control data, where the local reference carrier signal and the local reference ranging code are associated with one of the plurality of carrier signals. The plurality of receiver modules may each comprise a correlator for determining one of a plurality of correlations of the digital composite received signal to the local reference carrier signal and the local reference ranging code, where each of the plurality of correlations comprises an in-phase correlation and a quadrature correlation and is associated with one of the plurality of carrier signals. The aggregate predictive filter may be in communication with the plurality of signal generators and be for estimating the carrier corrective control data and the code corrective control data based on the plurality of correlations.

Code and carrier phase observations at multiple frequencies can measure a common distance (i.e., the distance from a specific satellite to the antenna of the receiver). Accordingly, the aggregate predictive filter combines the redundant measurements at multiple frequencies to jointly track the multiple satellite signals at various frequencies. The description herein illustrates the design of a fixed-point sigma rho filter and theoretically analyzes the stability issue of the sigma rho filter, which can lower computation load and simplify the digital implementation of the filter.

BRIEF DESCRIPTION OF THE DRAWINGS

FIG. 2, including

DETAILED DESCRIPTION

Figure 1:
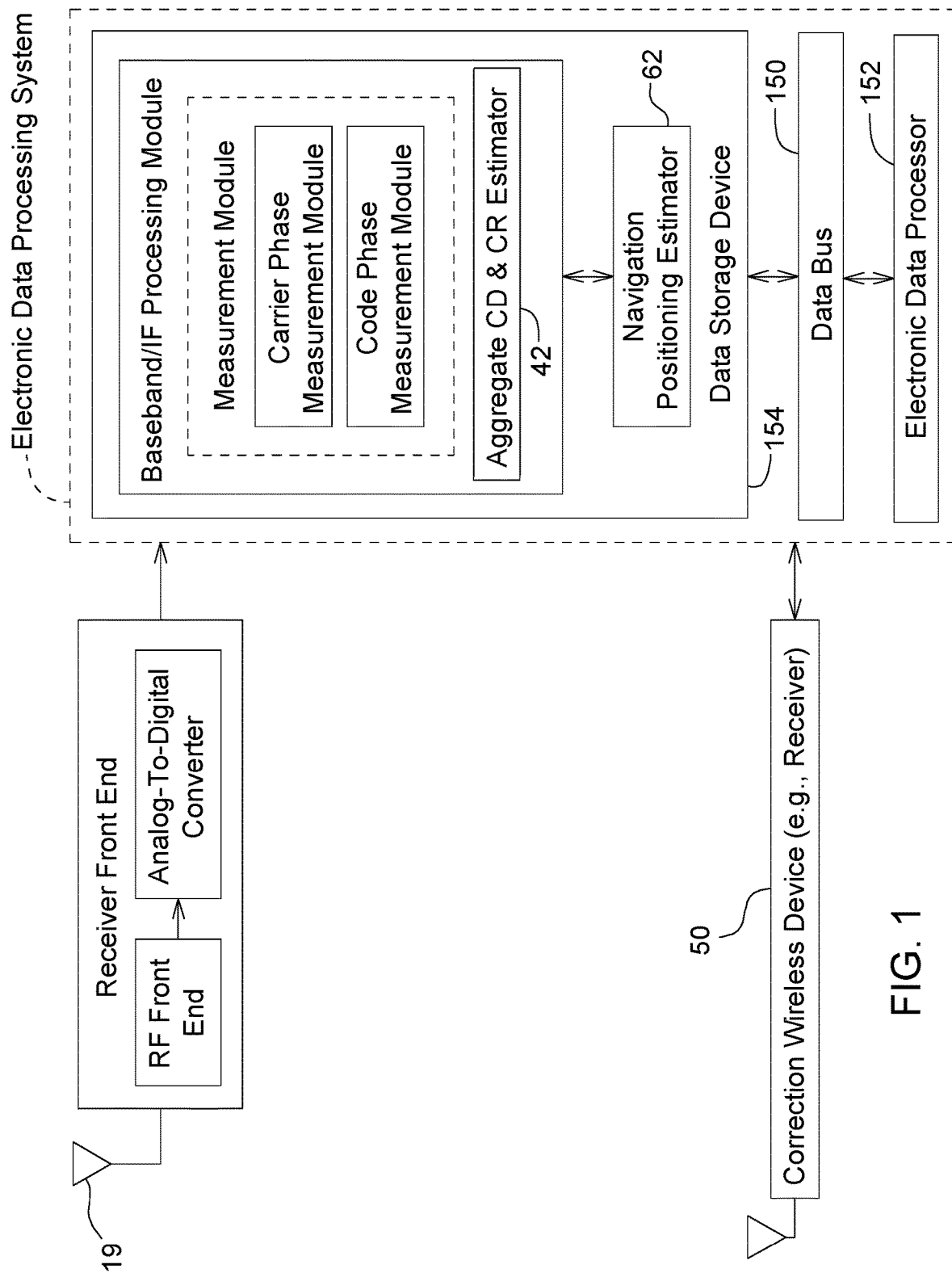
FIG. 1 is a block diagram of a satellite navigation receiver, in accordance with some embodiments.
Figure 2A:
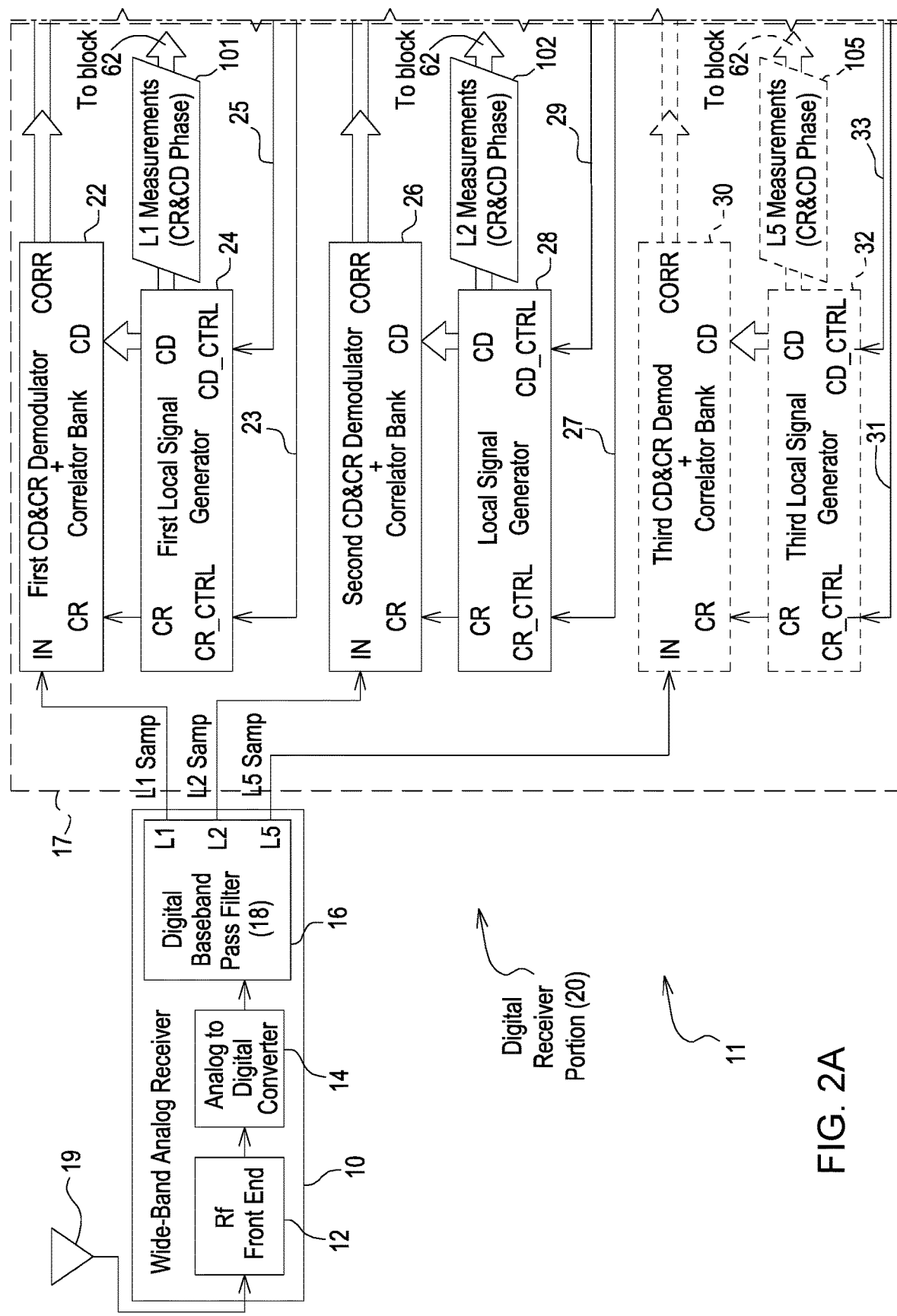
FIGS. 2A-2B, is a schematic diagram of a satellite navigation receiver, in accordance with some embodiments.
Figure 2B:
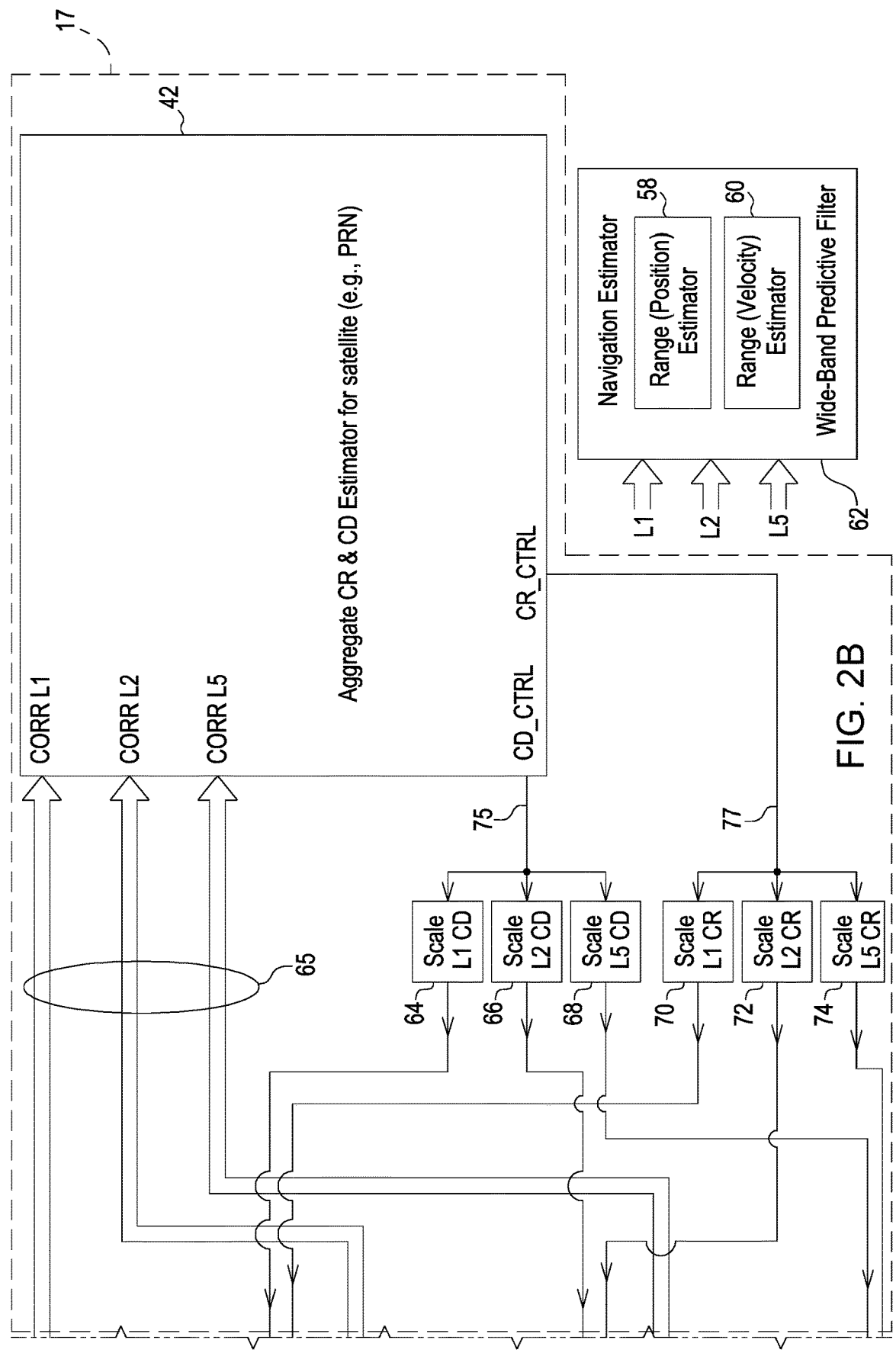

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

FIGS. 1, 2A-2B, and 3A-3B show a satellite navigation receiver 11 capable of receiving signals transmitted by satellites that include one or more carrier signals (e.g., a first carrier (L1), a second carrier (L2) and an additional third carrier (L5) of the Global Positioning System (GPS)) such that the receiver 11 can determine position, velocity, and time with very high accuracy and precision based on the received signals. The received signals may be transmitted from one or more satellites, such as a GPS satellite, a Galileo-compatible satellite, or a Global Navigation Satellite System (GLONASS) satellite. The satellites have known orbital positions versus time that can be used to estimate the relative position between an antenna 19 of the receiver 11 and each satellite, based on the propagation time of one or more received signals between three or more of the satellites and the antenna 19 of the receiver 11.

As used in this document, "CD" shall refer to code and "CR" shall refer to the carrier of the received signal or a digital representation of one or more samples of the received signal. The code may include a modulating code (e.g., PN code modulated with information) that modulates the carrier. In addition, "I" shall refer to an in-phase signal, whereas "Q" shall refer to a quadrature phase signal.

In embodiments, the receiver 11 described herein may comprise a computer-implemented system or method in which one or more data processors process, store, retrieve, and otherwise manipulate data via data buses and one or more data storage devices (e.g., accumulators or memory) as described in this document and the accompanying drawings. As used in this document, "configured to, adapted to, or arranged to" mean that the data processor or receiver 11 is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in FIGS. 1, 2A-2B, and 3A-3B and/or any other drawing in this disclosure. Alternately, separately from, or cumulatively with the above definition, "configured to, adapted to, or arranged to" can mean that the receiver 11 comprises one or more components described herein as software modules, equivalent electronic hardware modules, or both to execute any referenced functions, mathematical operations, calculations, determinations, processes, methods, algorithms, subroutine.

In any of the above referenced drawings of this document, any arrow or line that connects any blocks, components, modules, multiplexers, memory, data storage, accumulators, data processors, electronic components, oscillators, signal generators, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

In some embodiments, a correction wireless device 50 (e.g., transceiver or receiver of satellite or cellular signals) is coupled to the receiver 11, such as to a navigation estimator 62. The correction wireless device 50 can receive correction data or differential correction data in the spatial, phase domain that is based on measured range data or carrier phase data from one or more local reference stations. For example, the correction data may incorporate or provide precise satellite orbit and clock corrections, rather than normal satellite broadcast information (ephemeris data or other demodulated data provided by demodulating the code (e.g., C/A or course acquisition code for GPS)), on one or more satellite signals to determine a relative position or absolute position of a mobile user satellite navigation receiver (e.g., a rover receiver). Although the resulting positions can be accurate within a few centimeters, conventional precise positioning can take a long convergence time of up to tens of minutes to determine the integer ambiguity or floating ambiguity value in the carrier phase of each satellite signal to achieve the advertised steady-state accuracy.

In some embodiments, the rover receiver may use code phase estimates to provide a rough estimate of the position or pseudo-range of the rover receiver with respect to one or more satellites that can be used to reduce the search space for convergence on the carrier phase solution and resolution of the carrier phase ambiguity. At the start of a convergence period on the integer ambiguity solution or floating ambiguity value, the estimated integer ambiguity may be subject to a high variance or error than is required for precise carrier phase navigation within a few centimeters of accuracy.

The receiver 11 may include an analog receiver portion 10 coupled to a digital receiver portion 20. The analog receiver portion 10 includes an antenna 19 and a radio frequency (RF) front end 12. The receiver 11 may receive a signal that comprises one or more carrier signals from a satellite. The digital receiver portion 20 includes the portion of the receiver 11 that processes data after the analog-to-digital conversion of the received signal by an analog-to-digital converter (ADC) 14. For example, the digital receiver portion 20 can include an electronic data processor 152, a data storage device 154 (e.g., electronic memory), and a data bus 150 for communication between the electronic data processor 152 and the data storage device 154, where software instructions and data are stored in the data storage device 154 and executed by the data processor 152 to implement any of the blocks, components or modules (e.g., electronic modules, software modules, or both) illustrated in FIGS. 1, 2A-2B, and 3A-3B. The receiver 11 may be capable of: (a) determining a location of the antenna 19, (b) determining a range or distance between the antenna 19 and a satellite; and/or (c) determining ranges between the antenna 19 and one or more satellites.

Figure 4:
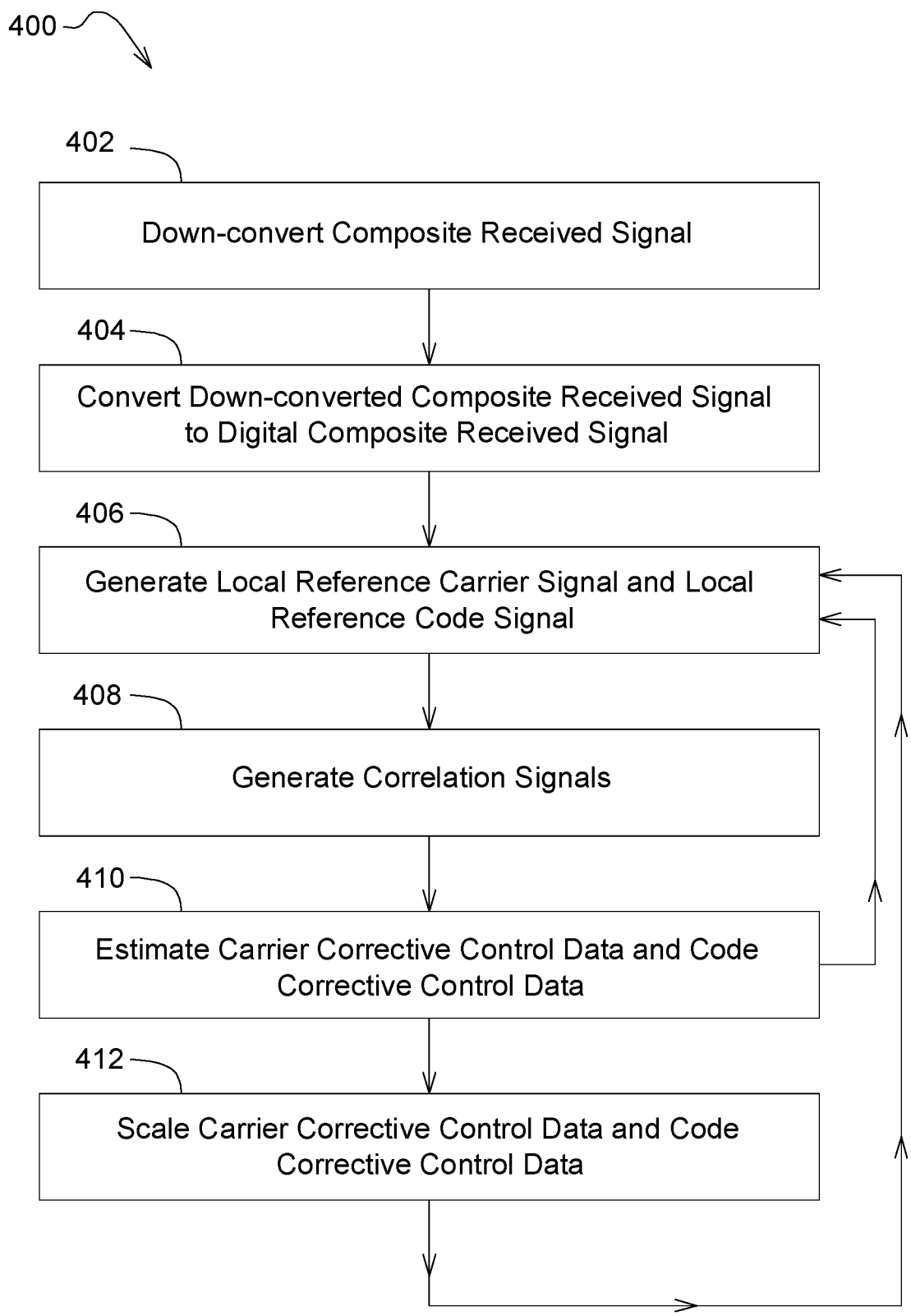
FIG. 4 is a flowchart illustrating operations for processing a composite received signal for satellite navigation using a satellite navigation receiver, in accordance with some embodiments.

A process 400 using the receiver 11 that may receive and process a received signal from a satellite to estimate carrier corrective control data and code corrective control data is shown in FIG. 4. The RF front end 12 of the analog receiver portion 10 may receive the signal(s) detected by the antenna 19 that have been transmitted from one or more satellites. In one embodiment, the RF front end 12 includes an amplifier, a down-conversion mixer, and a local oscillator (not shown). For example, the amplifier may be an RF or microwave amplifier (e.g., low noise amplifier) that is coupled to the antenna 19. The amplifier may provide an amplified signal to the down-conversion mixer as a first input. The local oscillator may provide a signal to the down-conversion mixer as a second input. The down-conversion mixer may move or lower the signal spectrum of the received signal from RF to an intermediate frequency (IF) or a baseband frequency, such as at step 402 of the process 400 shown in FIG. 4. The down-conversion system may include one or more mixing, amplifying, and filtering stages, as in known in the art.

The output of the down-conversion mixer in the RF front end 12 may be coupled to the ADC 14. The ADC 14 may convert the analog intermediate frequency signal or analog baseband signal to a digital signal, such as at step 404 of the process 400. The digital signal may include one or more digital samples that are available at a sampling rate. Each sample may have a finite quantization level and each sample may be capable of being processed by an electronic data processing system, e.g., the digital receiver portion 20 of the receiver 11.

In some embodiments, the output of the analog receiver portion 10 may be coupled to an optional digital interface 16. The digital interface 16 may include buffer memory (not shown) that can temporarily store the output of the ADC 14 for processing by the digital receiver portion 20. The digital interface 16 may also include a digital filter that filters one or more down-converted carrier signals. For example, the digital filter may be a band-pass filter 18 that provides a filtered L1 carrier signal, a filtered L2 carrier signal, and a optional filtered L5 carrier signal.

The digital signal output by the ADC 14 or the filtered carrier signals output from the band-pass filter 18 may be input into the digital receiver portion 20 of the receiver 11, and in particular to a baseband module 17. The digital signal or filtered carrier signals may be received by a first CD/CR correlation module 22, a second CD/CR correlation module 26, and a third CD/CR correlation module 30, respectively. Each CD/CR correlation module 22, 26, 30 may include a carrier wipe-off module 226, a bank of local code replica with various phase shifts with respect to the input signal, and a bank of corresponding integrate and dump (I & D) modules 224, as shown in FIG. 3A. In one embodiment, the carrier wipe-off module 226 can convert the digital samples of the digital signal to an exact baseband digital signal representation by removing the residual CR frequency. Each CD/CR correlation module 22, 26, 30 can be associated with a different carrier frequency or frequency range for the received satellite signal, such as the first carrier frequency (e.g., L1), the second carrier frequency (e.g., L2), and the optional third carrier frequency (e.g., L5).

Figure 3:
FIG. 3, including
Figure 3A:
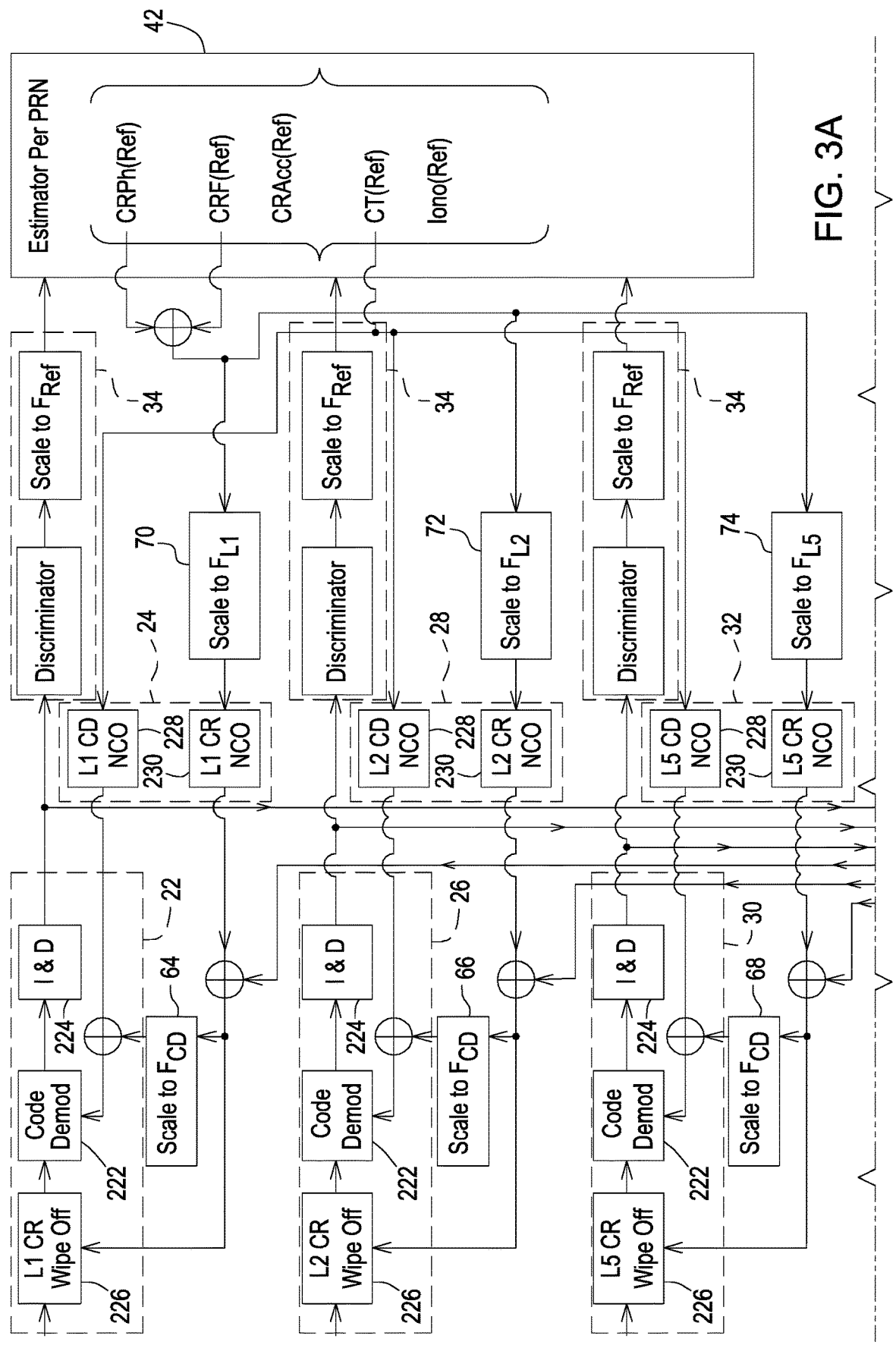
FIGS. 3A-3B, is a schematic diagram of baseband processing components of a satellite navigation receiver, in accordance with some embodiments.
Figure 3B:
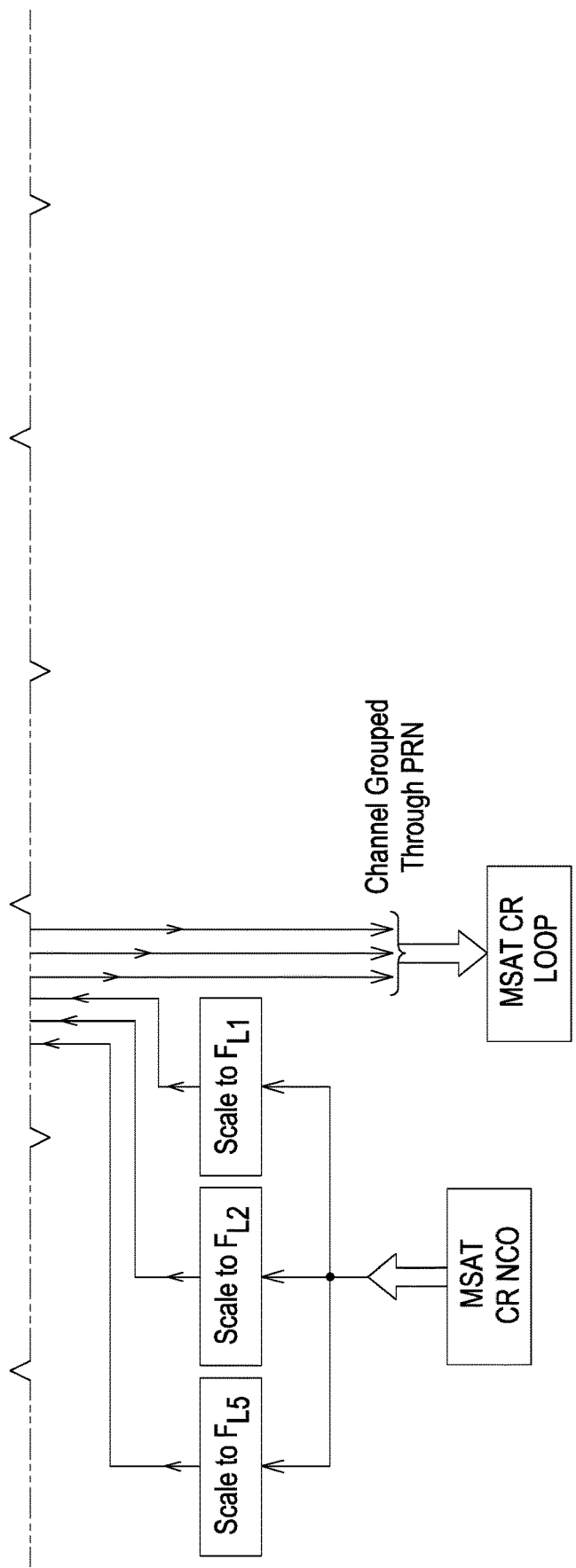

Local signal generators 24, 28, 32 (e.g., including numerically controlled oscillator (NCO) modules 228, 230 for each carrier frequency, as shown in FIG. 3) may provide a local estimation of CR phase and CD phase for each digital sample, such as at step 406 of the process 400, which is used to remove the residual CR frequency and phase and residual CD phase in the sample. In one embodiment, the carrier wipe-off module 226 outputs I and Q components of the digital signal for input into the bank of correlators that consists of a bank of code demodulators 222 and corresponding I & D modules 224 within each of the CD/CR correlation modules 22, 26, 30. The local signal generators 24, 28, 32 may be adapted to generate local reference carrier and code signals that include the CR phase and CD phase for each digital sample. Each local signal generator 24, 28, 32 may be associated with a set of different carrier and code signals within the digital composite received signal. In embodiments, the local signal generators 24, 28, 32 may generate the local reference carrier and code signals based on carrier corrective control data and code corrective control data from an aggregate predictive filter 42. The aggregate predictive filter 42 may be driven by a sigma rho filtering algorithm, as described below.

Within each CD/CR correlation module 22, 26, 30, an output of the carrier wipe-off module 226 may be fed into a bank of correlators. In one embodiment, the bank of correlators consists of a bank of the code demodulator 222 and a corresponding I & D module 224. The bank of code demodulators 222 may generate multiple codes with various phase shifts against the input signal.

In one embodiment, the bank of correlators has multiple outputs that are used to synchronize the local CD phase, CR frequency, and CR phase estimation with the received samples. For example, each correlator may include one or more of the following modules: one or more CR wipe-off portions, a bank of CD wipe-off modules and corresponding I & D modules, and/or one or more multipliers or mixers.

As used in this document, a module may comprise hardware and/or software. In one embodiment, each correlator can maximize a correlation between the received signal with a locally generated code by synchronizing the locally generated CD phase with the CD phase in digital sample or digital signal. Further, multiple locally generated CD signals (e.g., early (E), prompt (P), and late (L) CD signals) may be used to form a corresponding CD misalignment signal using various discriminator functions.

Each local signal generator 24, 28, 32 may include a separate code signal generator and a carrier signal generator, for example. Each code signal generator 228 may generate a locally generated replica of a pseudo random noise code, a pseudo noise (PN) code sequence, or the like. The code signal generator 228 may be associated with a shift register or another device to provide multiple outputs that are offset in time or phase with respect to each other. For example, the code signal generator 228 may have an early output (E), a prompt output (P), and a late output (L) that are provided to the set of correlators. The early output may provide an early PN code that is advanced against the current estimated code phase by a known time period (e.g., one half chip); the prompt output may provide a prompt PN code that reflects the current estimated code phase; and the late output may provide a late PN code that is delayed in time with respect to the prompt PN code by a known time period (e.g., one half chip). If correlations are available between the received signal and the early, prompt, and late variants of the locally generated replica of the received signal, the receiver 11 may adjust the phase and time delay (e.g., via shift registers) of the locally generated replica in an attempt to maximize correlation, for example.

In one embodiment, the code signal generator 228 may include any generator for generating a spread spectrum code, spread spectrum sequence, binary sequences, Gold codes, a PN code, a pseudo-random noise code sequence; a PN code that is similar to a spread spectrum code, spread spectrum sequence, binary sequences, Gold codes, pseudo-random noise code, pseudo-random noise code sequence; or a PN code transmitted by a transmitter of a satellite for reception by the receiver 11 as the composite received signal. In another embodiment, the code signal generator 228 may include a series of shift registers that are loaded with an initial starting code sequence. The shift registers may have various selectable or controllable taps for providing feedback and reiterative values as the output. In one embodiment, three versions (E, P, L) of a PN code from the code signal generator 228 can interact with the two versions (I, Q) of the received signals of each carrier to produce various permutations of local replica signals to generate different correlations through the integration-and-dump module 224. A bank of correlations, which is outputted by the correlators, may be used for decoding, demodulating, and CD and CR phase tracking.

The CD/CR correlation modules 22, 26, 30 may generate multi-frequency correlations (e.g., CORR L1, CORR L2, and CORR L5) for each satellite, such as at step 408 of the process 400. The correlation products at each frequency may measure the single distance between a specific satellite and the receiver 11. Therefore, the range measurements at each frequency can contain redundant information. Due to frequency-selective effects, such as the influence of the ionosphere, the correlation range measurements at one frequency may be slightly different from the correlation range measurements at another frequency. The correlations may be output from the CD/CR correlation modules 22, 26, 30 over a data bus 65, for example, and be processed by an aggregate predictive filter 42 that is adapted to estimate and provide carrier corrective control data and code corrective control data (labeled as outputs CR_CTRL and CD_CTRL, respectively), such as at step 410 of the process 400. As shown in processes 400 and 500, the carrier corrective control data and code corrective control data from the aggregate predictive filter 42 may consist of a frequency-independent part and a frequency-selective part. The frequency-independent control data is provided at a reference frequency, which is scaled to each individual frequency through a scale module as 64, 66, 68, 70, 72, 74. The frequency-selective part is estimated individually at each frequency to account for effects such as ionospheric divergence. The scaled carrier corrective control data and scaled code corrective control data may be provided as feedback to the local signal generators 24, 28, 32 for use at step 406. The carrier corrective control data and the code corrective control data may include, for example, an estimated code phase, an estimated carrier phase at a reference frequency, a Doppler shift, a rate of change of the Doppler shift, a strength of the plurality of carrier signals, and/or an amplitude of the plurality of carrier signal.

Since the aggregate predictive filter 42 utilizes every available correlation, the common component embedded in the correlation provides the redundancy. Such redundancy can improve performance of the receiver 11 in a frequency-selective fading environment, i.e., the aggregate predictive filter 42 can use correlations on the frequency with the least impact to update the signal generators 24, 28, 32 regardless of the quality of their own correlations. The receiver 11 having the fixed point aggregate predictive filter 42 described herein is therefore well-suited to provide reliable position, range, and velocity estimates in the presence of frequency-selective interference and/or fading or low signal strength of the satellite signals.

The aggregate predictive filter 42 may include a fixed point sigma rho filter that is based on a modified extended Kalman filter. The aggregate predictive filter 42 may utilize a standard deviation term (sigma parameter) and a cross correlation term (rho parameter) to improve the numerical stability of the filter. This is in contrast to a typical extended Kalman filter that uses a covariance matrix. The numerical range of computations of the parameters of the aggregate predictive filter 42 may accordingly be reduced by a factor of a square root.

In FIG. 3A, a specific case of the modeled parameters is shown in the aggregate predictive filter 42 as a 5-element state vector. In some embodiments, the modeled parameters may be an n-element state vector. The 5-element state vector shown in FIG. 3A includes CRPh(Ref) denoting the carrier phase error at the reference frequency; CRF(Ref) denoting the carrier frequency at the reference frequency; CRAcc (Ref) denoting the carrier acceleration at the reference frequency; CT(Ref) denoting the channel time at the reference frequency; and Iono(Ref) denoting the ionospheric-related carrier frequency at the reference frequency.

The aggregate predictive filter 42, the local signal generators 24, 28, 32, and the frequency scaling modules 64, 66, 68, 70, 72, 74 may form carrier tracking modules and code tracking modules or a joint tracking module as the aggregate predictive filter 42. The carrier tracking modules and the code tracking modules may collectively be referred to as the tracking module. The tracking module can support the measurement of the CR frequency, CR phase, and CD phase (individually or collectively) of the received signals to control one or more locally generated reference signals with respect to corresponding received signals (derived from the composite received signal) such that the correlation of the corresponding received signals to the respective locally generated reference signals is maximized. In one embodiment, the receiver 11 may receive four received signals from at least four different satellite transmitters to estimate the position (e.g., in three spatial dimensions) of the antenna 19. For example, the individual code and carrier tracking module or the joint tracking module can generate measurement data that the receiver 11 uses to control an adjustable time delay (e.g., routing data through known number or sequence of shift registers), and/or engage in other data processing of one or more digital signals associated with a locally generated reference signal with respect to the received signal to maximize the correlation of each received signal to the corresponding locally generated reference signal.

In certain embodiments, the multi-frequency correlations resulting from CD/CR correlation modules 22, 26, 30 are processed by the aggregate predictive filter 42. In embodiments, the aggregate predictive filter 42 can be realized using a sigma rho filtering algorithm and may include a carrier phase error detector, a frequency error detector, and a code error detector. The aggregate predictive filter 42 may function as a multi-frequency joint code and carrier tracking filter that replaces the multiple tracing loops in a conventional receiver that includes a code loop, a carrier frequency loop, and a carrier phase loop.

A carrier tracking component of the aggregate predictive filter 42 may facilitate the alignment of the phase of the locally generated replica of the CR to the received signal. Carrier control data or a control signal 77 to the local signal generators 24, 28, 32 may adjust the locally generated replica signal of the CR produced by the carrier NCO module 230. In one embodiment, the carrier NCO module 230 may provide a locally generated replica of the carrier to the carrier wipe-off module 226. The carrier NCO module 230 may receive a carrier phase correction signal and output an adjusted clock signal or another control signal for generating the locally generated CR frequency that accurately aligns with the CR phase or the residual carrier phase of the received sample.

The code tracking component of the aggregate predictive filter 42 may facilitate the alignment of the phase of the locally generated PN replica with respect to the received sample. The code tracking component may provide control data or a control signal 75 to adjust the local signal generators 24, 28, 32, where the code NCO module 228 can control the chipping rate of the local signal generator 24, 28, 32. The code tracking module, which conventionally comprises a delay locked loop (DLL), may generate a control signal to tune the chipping rate of code NCO module 228. The CD phase (i.e., the output of code NCO module 228) may be used to drive the local signal generator 24, 28, 32. Multiple local PN sequences may be generated by the local signal generator 24, 28, 32. The local PN waveform can advance, synchronize, or delay its phase against the CD phase of the received sample.

In one embodiment, a local signal generator may drive a carrier measurement module and a code measurement module. The carrier measurement module may include a CR phase counter which may count both the number of integer cycles plus the fractional cycles of the received CR during a known time period. The code measurement module may include a millisecond counter, a chip counter, and a fractional chip counter, where the combination of those counters may provide the pseudo range measurement.

Within each CD/CR correlation module 22, 26, 30, a code demodulator 222 may provide satellite navigation data for estimating a range (e.g., distance between a satellite and the antenna 19) or a position (e.g., in two or three dimensional coordinates) of the phase center of the antenna 19. The satellite navigation data or other signal information may include one or more of the following information that modulates the baseband waveform of the received signal: date, satellite navigation system time, satellite status, orbital data, ephemeris data, almanac, satellite location, and/or satellite identifier. The code demodulator 222 may use phase shift keying, phase demodulation, pulse width demodulation, amplitude demodulation, quadrature amplitude demodulation, or another demodulation technique that is consistent with the modulation by the modulator at the satellite transmitter.

In one embodiment, the code demodulator 222 can output a demodulated signal or demodulated encoded data, such as a demodulated digital signal with a quadrature phase component and an in-phase component at baseband. The code demodulator 222 may remove the PN sequence. After the PN sequence is removed, the resulting waveform may become a square wave that represents the data. The data may include one or more following information such as date, satellite navigation system time, satellite status, orbital data, ephemeris data, almanac, satellite location, and/or satellite identifier.

In one embodiment, the measurement generation module 101, 102, 105 or the local signal generators 24, 28, 32 may estimate the propagation time between transmission of a satellite signal from a certain satellite to the antenna 19. The navigation estimator 62 may convert the propagation time into a distance or range proportional to the speed of light, using a position estimator 58 and/or velocity estimator 60. The navigation estimator 62 may also determine a range, pseudo-range, or estimated range between the antenna 19 and four or more satellites with a reliable signal quality or signal strength based upon one or more of the following: (a) the measured CD phase of each received signal, and/or (b) the measured CR phase of each received signal. In one embodiment, the navigation estimator 62 or digital receiver portion 20 may resolve ambiguities in the measured CR phase of the received signal by searching for a solution that is consistent with one or more of the following: (1) a position estimated from decoding the code portion of the signal, (2) a known reference position of the antenna 19, and/or (3) differential correction data applicable to the received signal. Furthermore, the navigation estimator 62 may be associated with a wireless receiver (e.g., satellite receiver, mobile transceiver, or cellular transceiver) that receives navigation correction data from a reference satellite navigation receiver to reduce or eliminate sources of bias or error (e.g., certain clock errors or propagation errors) in the CR phase measurements.

The navigation estimator 62 can determine the position estimate of the antenna 19 based on the measured CR phases, estimated ranges, and demodulated data. For example, the navigation estimator 62 may use ranges from four or more satellites to determine the position, velocity, or acceleration of the antenna 19 of the receiver 11 in two or three dimensions.

In the digital receiver portion 20, the receiver 11 may include hardware and/or software instructions. For example, in one illustrative embodiment, the hardware may include a data processor that communicates to a data storage device, which stores software instructions, via one or more data buses. In the digital receiver portion 20, as used throughout the document, the data processor may include one or more of the following: an electronic data processor, a microprocessor, a microcontroller, an application specific integrated circuit (ASIC), digital signal processor (DSP), a programmable logic device, an arithmetic logic unit, or another electronic data processing device. In the digital receiver portion 20, the data storage device may comprise electronic memory, registers, shift registers, volatile electronic memory, a magnetic storage device, an optical storage device, or any other device for storing data. The data processor may be coupled to the data storage device via one or more data buses, which support communication between the data processor and the data storage device. As used herein the data processor may refer to one or more components or modules of the digital receiver portion 20, including but not limited to any of the following: the carrier wipe-off module 226, the code wipe-off module, the integration-and-dump module 224, the bank of correlators, the local signal generators 24, 28, 32, code tracking module, carrier tracking module, measurement generation module 101, 102, 105, code demodulator 222, and navigation estimator 62.

In general, the digital receiver portion 20 may include a computer or an electronic data processing system that includes an electronic data processor, digital logic circuits, multiplexers, multipliers, digital filters, integrators, delay circuits, oscillator, signal generator, PN code sequence generators, registers, shift registers, logic gates, and/or other hardware. The electronic data processing system may support storage, retrieval and execution of software instructions stored in a data storage device.

Figure 5:
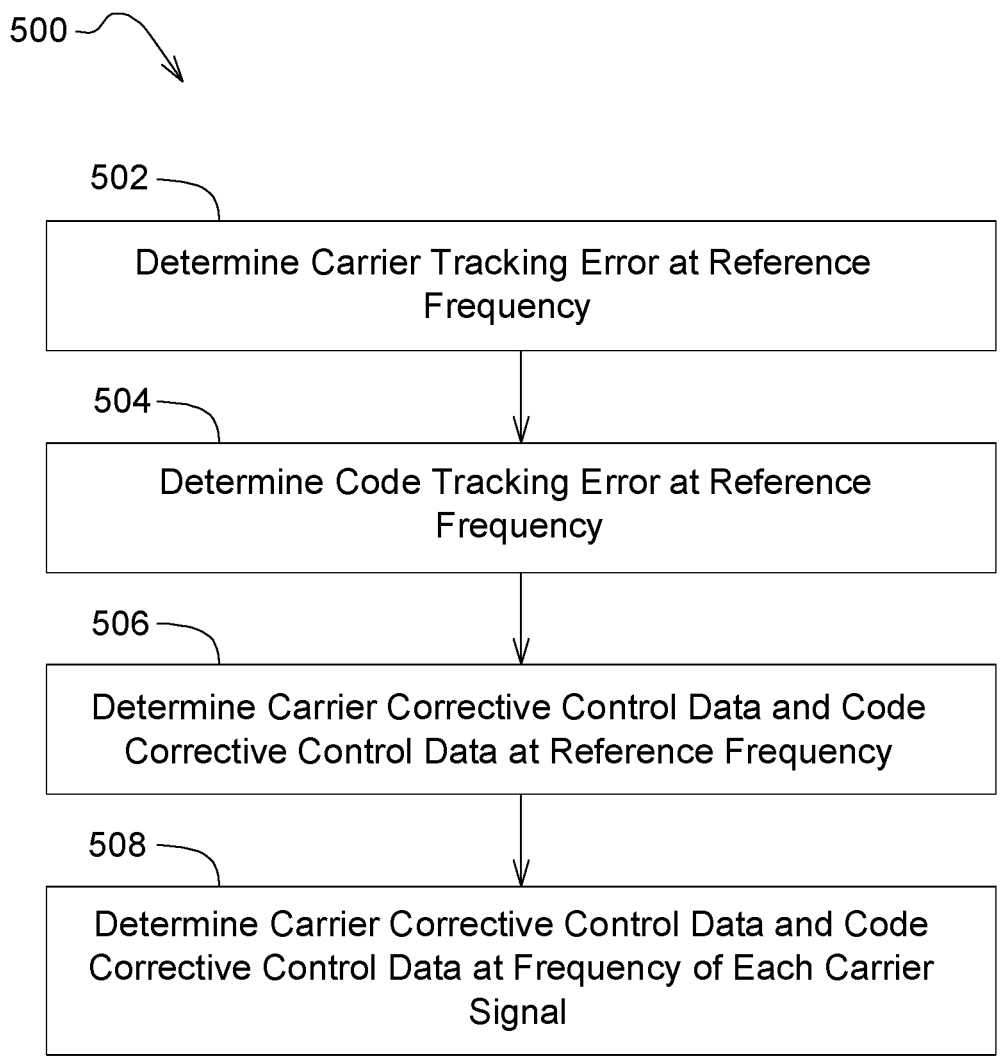
FIG. 5 is a flowchart illustrating operations for estimating the carrier corrective control data and the code corrective control data using a satellite navigation receiver, in accordance with some embodiments.

In one embodiment, the aggregate predictive filter 42 may utilize a process 500 shown in FIG. 5 to estimate the carrier corrective control data and the code corrective control data. The process 500 may be an embodiment of step 410 of the process 400 described above. At step 502, a carrier tracking error may be determined at a reference frequency from the plurality of correlations received by the aggregate predictive filter 42 from the CD/CR correlation modules 22, 26, 30. The carrier tracking error may be determined by a carrier loop discriminator, for example. A code tracking error may be determined at the reference frequency, such as at step 504, from the plurality of correlations. The code tracking error may be determined by a code loop discriminator, for example.

The carrier tracking error and the code tracking error may be utilized by a joint estimator, for example, to estimate the carrier corrective control data and the code corrective control data. In particular, at step 506, the carrier corrective control data and the code corrective control data may be determined at the reference frequency, based on the carrier tracking error and the code tracking error from steps 502 and 504. The carrier corrective control data and the code corrective control data may be estimated at a frequency of each of the carrier signals, such as at step 508, based on the carrier tracking error and code tracking error from steps 502 and 504. The carrier corrective control data and the code corrective control data at the reference frequency and at the frequency of each of the carrier signals may be provided for use at step 406 of the process 400 by the local signal generators 24, 28, 32.

The following description uses a notation system that includes using n as the sampling epoch; i, j, and k as the index of either the row or column of an element in a matrix or a vector; N as the number of an element in a state vector; x as a state vector; and x̌ as a normalized state vector. In addition, a symmetric truncation (i.e., a symmetric right shift) calculation is defined as $$x_k^p \gg u := \mathrm{ROUND}\left(\frac{x_k^p}{2^u}\right),$$

where $x_k^p$ is a fixed point representation of a floating point variable $x_k$ that has p-bit extra precision, where k=0, 1, ..., N−1, and is converted according to the equation $x_k^p = \mathrm{ROUND}(x_k 2^p)$.

Figure 7:
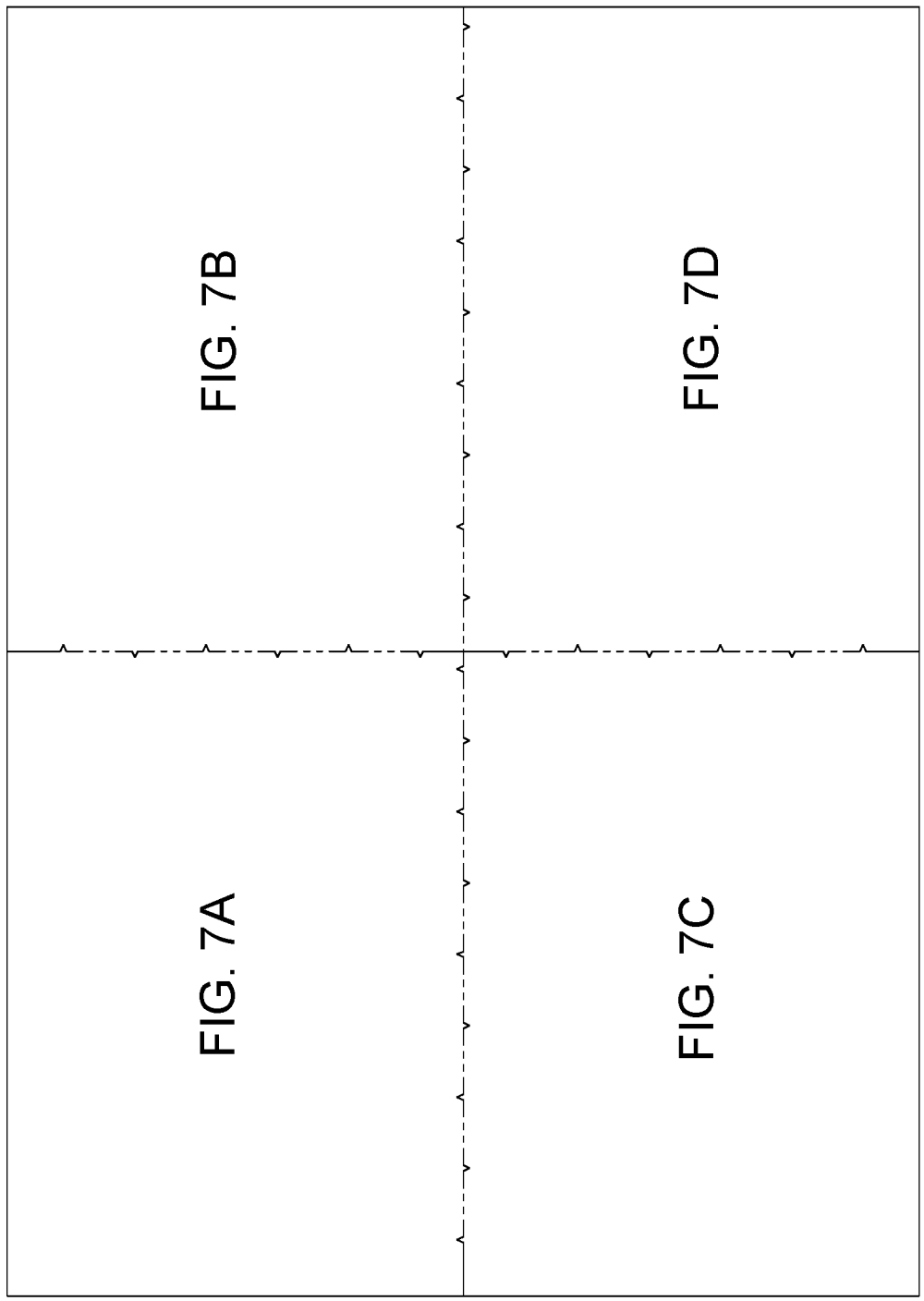
FIG. 7, including
Figure 7A:
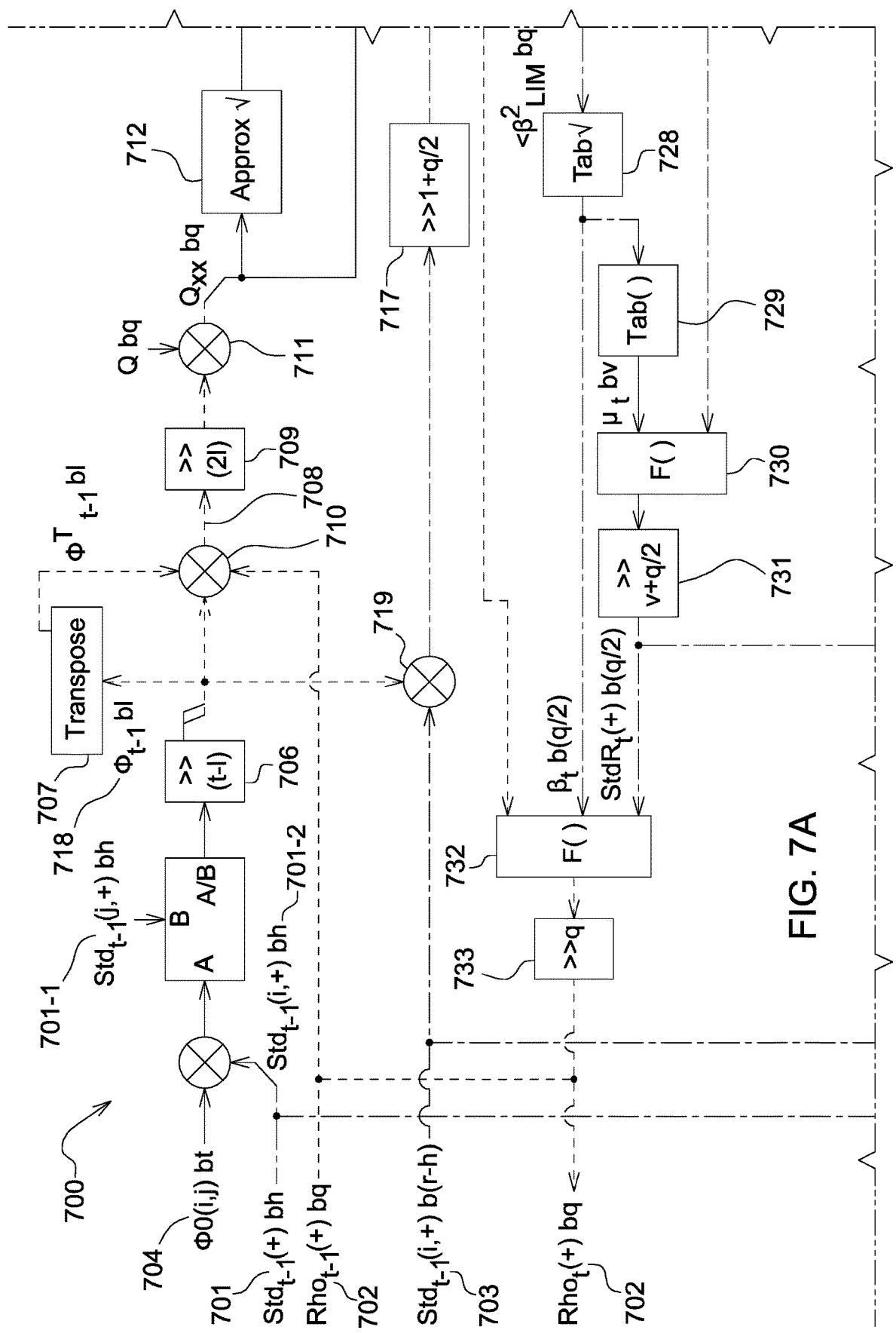
FIGS. 7A-7D, is a system diagram illustrating the operation of the sigma rho filter in a satellite navigation receiver, in accordance with some embodiments.
Figure 7B:
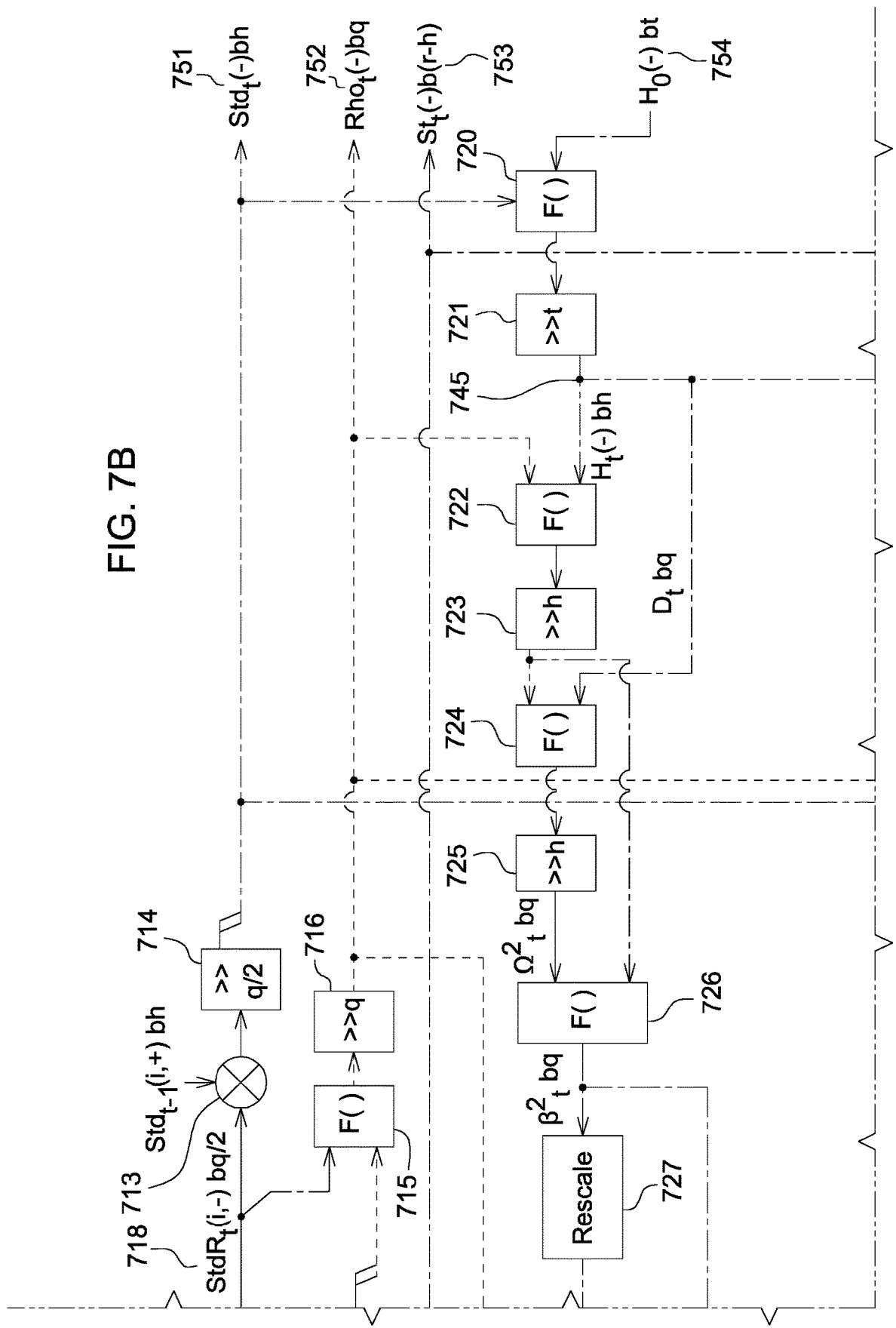
Figure 7C:
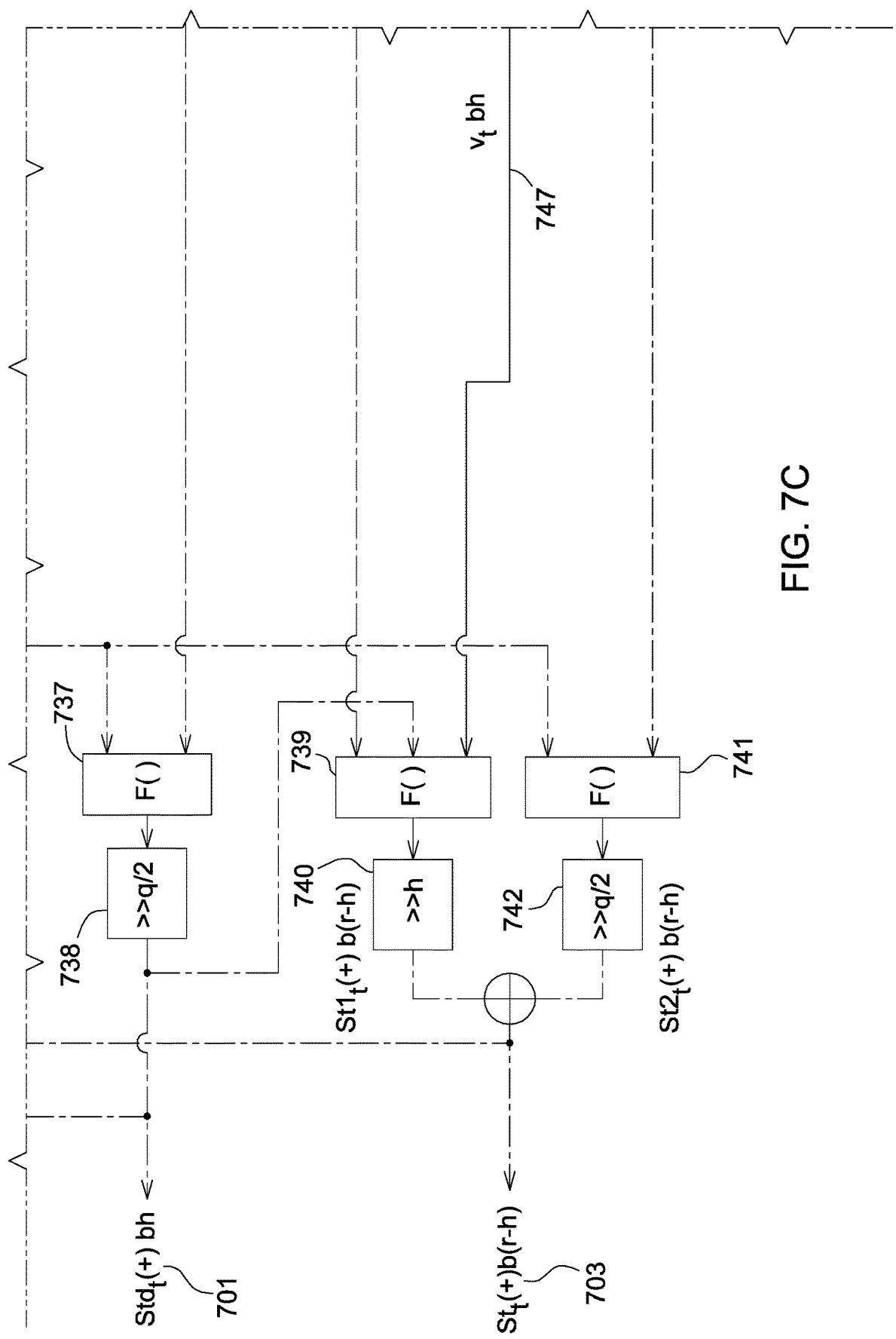
Figure 7D:
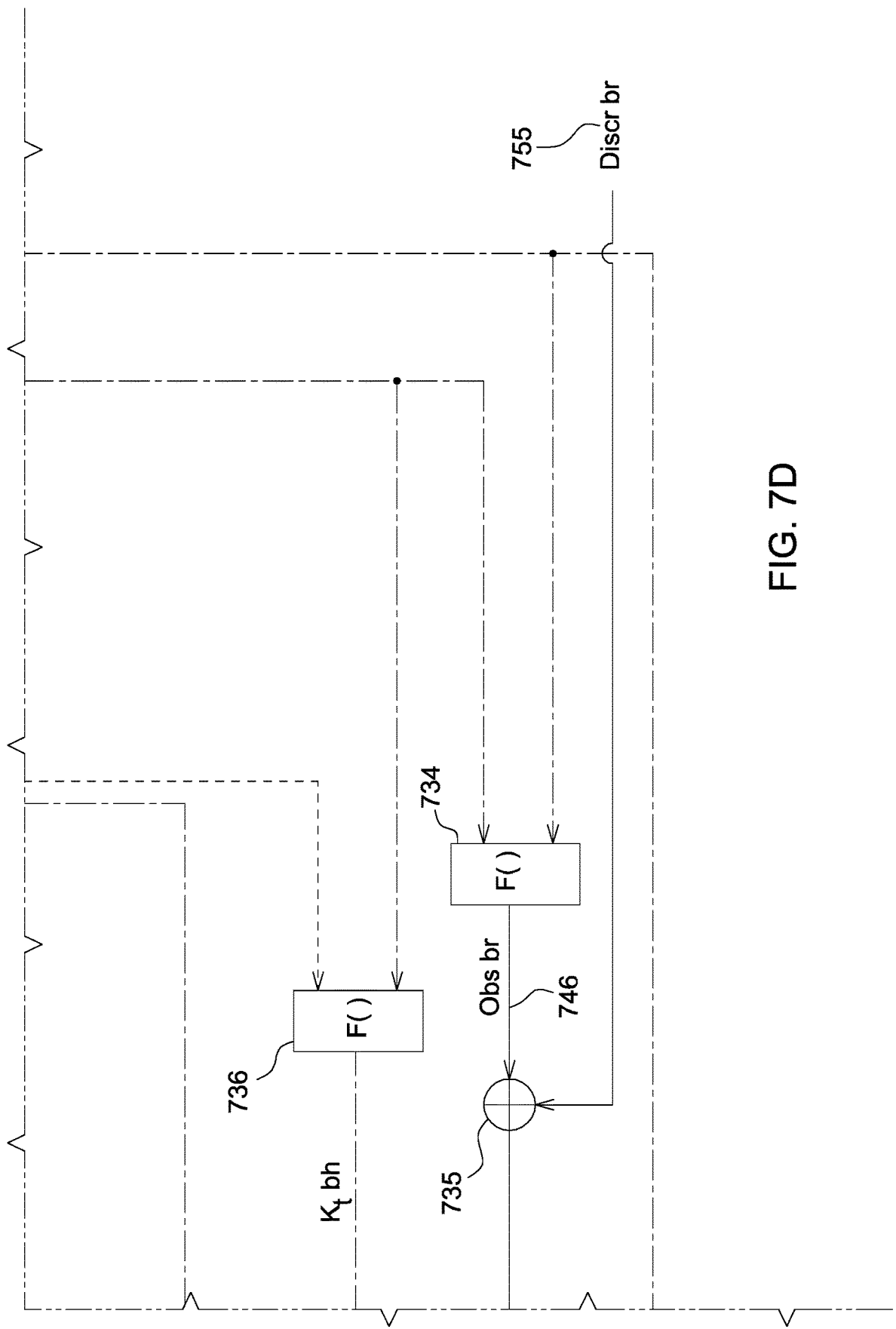

A fixed point sigma rho filter can be modeled by a set of notation of the extra bit to each variable. For example, equation (2) illustrates that p-bit precision is applied on the variable or vector $x_k$. The bit of precision can be represented by g, p, s, t, h, q, l, v, and r. Accordingly, each variable in FIG. 7 is also noted with the precision bits, for example "bt" indicates the corresponding variable has a precision of t bits. To simplify the operation module of FIG. 7, a universal function symbol "F( )" has been adopted to represent various functions, e.g., modules 715, 720, 722, 724, 726, 730, 732, 734, 737, 739 and 741 may represent identical or different mathematical computations. Each of the modules will be modeled through mathematical equations in the following sections.

The cyclic process 700 in FIG. 7 is driven by a pair of propagations named the dynamic propagation and the measurement update, similar to a conventional Kalman filter. The aggregate predictive filter 42 may propagate a triplet (x̌, ρ, σ), which represents a normalized state 703, correlation coefficients 702, and a standard deviation 701, respectively. In particular, the normalized state 703 is the original state vector (not shown) to the standard deviation vector 701; the correlation coefficients 702 are a symmetric matrix denoting the correlation between any of the two states in the normalized state 701; and 703 is a normalized state vector. The following sections utilize FIG. 7 to describe the cyclic propagation of the aggregate predictive filter 42.

Before starting the dynamic propagation stage, the parameters of the sigma rho filter can be configured with initial conditions resulting from the signal detection part. For example, $\Phi_B^t$ 704 denotes the constant base transition matrix with t bit precision, $\sigma^{+,h}$ 701 with precision of h bit may be initialized with the default standard deviation to the normalized state $x^{+,s-h}$ which has a precision of s-h bits. The normalized state $x^{+,s-h}$ may be initialized according to the output from the coarse estimation stage, e.g., the signal detection stage. Additionally, since there are two propagations to drive the aggregate predictive filter 42, any parameter with a superscript "−" indicates the resultant value from the dynamic propagation, and any parameter with a superscript "+" indicates the result of the measurement update.

It should also be noted that in FIGS. 7-12, the lines connecting the various modules represent different types of calculations. In particular, a dashed line (e.g., the line extending from 702) represents a matrix-based calculation, a dashed-dotted line (e.g., the line extending from 703) represents a vector-based calculation, and a solid line (e.g., the line extending from 755) represents a scalar-based operation.

Figure 6:
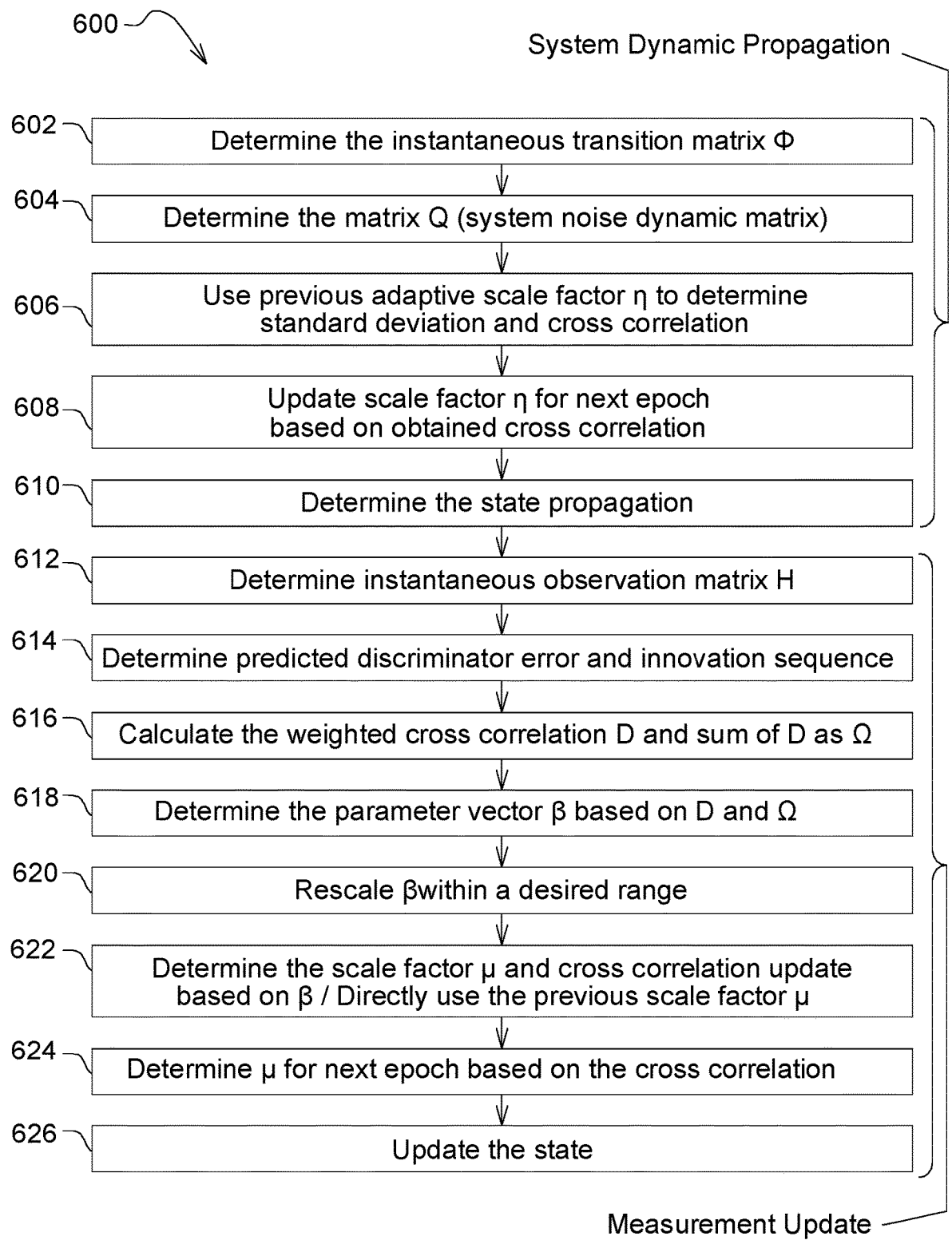
FIG. 6 is a flowchart illustrating operations for estimating the carrier corrective control data and the code corrective control data using a sigma rho filter in a satellite navigation receiver, in accordance with some embodiments.

The cyclic propagation starts with the dynamic propagation, where the initial system transition matrix $\Phi_B{}^t$ with t bit precision may be updated with the latest standard deviation of one state 701-1 and the standard deviation of another state 701-2. The selection of the states 701-1 and 701-2 can depend on the row and column of the element in the initial system transition matrix $\Phi_B{}^t$, which is scaled by (t−l) bits to obtain the instant transition matrix of $\Phi_n{}^l$ at epoch n with l bit precision, such as at step 602 in the process 600 shown in FIG. 6, which is modeled by:

$$\Phi_{ij,n}^{l} = \Phi_{B,ij}^{t} \frac{\sigma_j^h}{\sigma_i^h} \gg (t - l). \tag{1}$$

The updated transition matrix $\Phi_n{}^l$ may be combined with the correlation coefficients matrix 702 using the multiplier 710. The temporary result 708 has a precision of 2l+q bits. Therefore, a scale unit 709 can be applied to adjust the result with q bit precision. An adder 711 may combine the output from the scale unit 709 and the constant system noise matrix $Q^q$ to form the instant system noise matrix, such as at step 604 of the process 600, according to:

$$Q_{xx,n+1}^{-q} = (\Phi_n^l \rho_n^{+,q} \Phi_n^{lT} \gg 2l) + Q^q \tag{2},$$

where $Q_{xx,n+1}^{-q}$ denotes the system noise matrix at epoch n, and $\rho_n^{+,q}$ is the correlation coefficient matrix with q bit precision at epoch n after measurement update.

Figure 8:
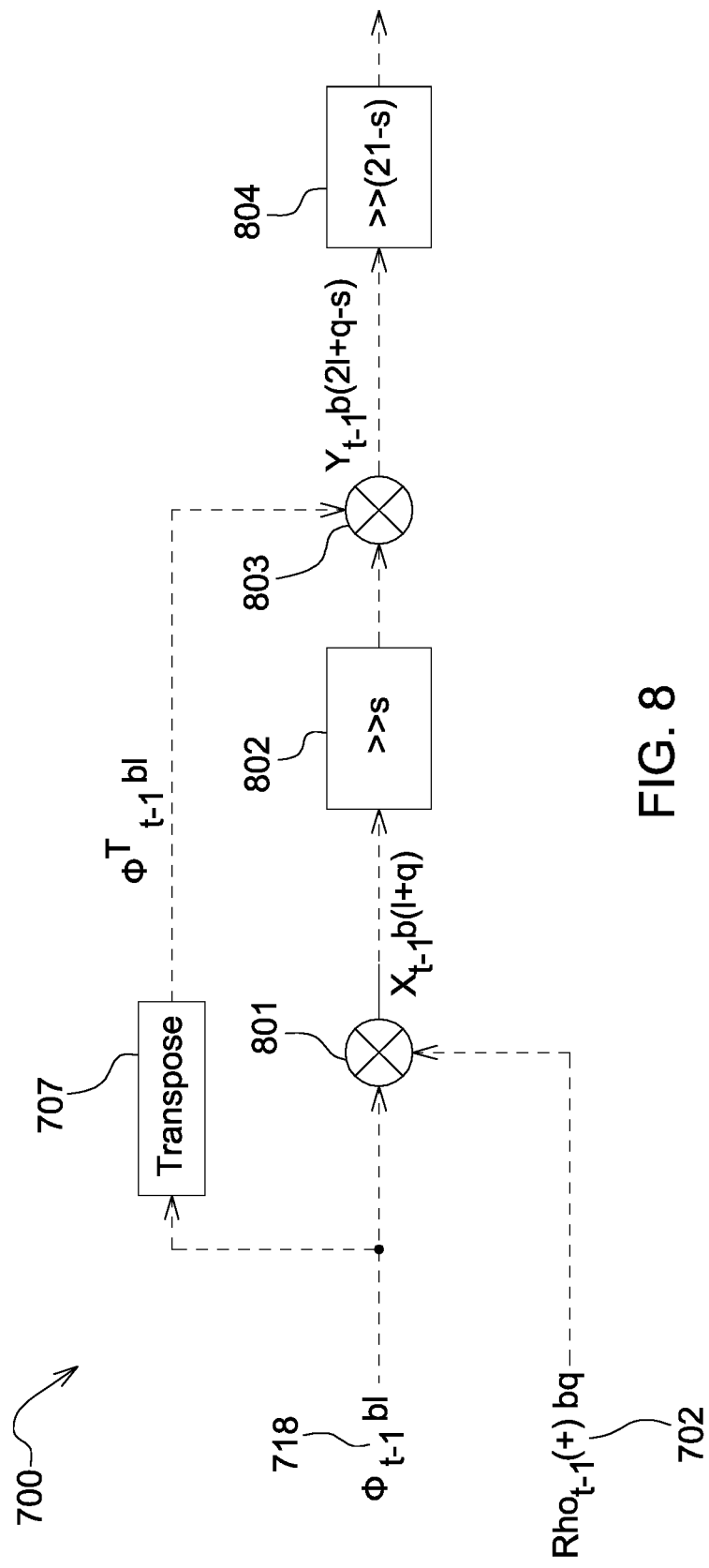
FIG. 8 is a diagram illustrating a two stage update of a system transition matrix, in accordance with some embodiments.

In equation (2), three matrices are multiplied before a symmetric truncation of 2l bits. The precision of the normalized transition matrix $\Phi_n{}^l$ and the cross-correlation function $\rho_n^{+,q}$ may be limited due to the result of having 2l+q bits for the matrix $Q_{xx,n+1}^{-q}$. To economize the number of logic gates in a digital circuit design, it may be desirable in some embodiments to use a two stage truncation to calculate the matrix $Q_{xx,n+1}^{-q}$ according to:

$$Q_{xx,n+1}^{-q} = ((\Phi_n^l \rho_n^q \gg s) \Phi_n^{lT} \gg (2l-s)) + Q^q \tag{3},$$

where, as shown in FIG. 8, the matrix 718 multiplies matrix 702 through a matrix multiplier 801. The middle result from the matrix multiplier 801 may be truncated by s bit to reduce the register size. The output of scale unit 802 may be multiplied with the output of transpose unit 707 to generate a second temporary result which is scaled by a scale unit 804 to obtain the updated transition matrix $\Phi_n{}^l$.

At step 606 of the process 600, a square root module 712 may approximately calculate the square root as $$\alpha_i^{-\frac{q}{2}} = \left(\frac{\sigma_i^{-,h}}{\sigma_i^{+,h}}\right)^{\frac{q}{2}} \tag{4}$$

$$= \sqrt{Q_{xx,n+1}^{-q}} = \left(\eta^g \gg g - \frac{q}{2}\right) + \eta^g Q_{xx,n+1}^{-q} \gg \left(g + \frac{q}{2}\right).$$

The variable g in equation (4) may be selected to be $$\frac{q}{2}$$

in some embodiments to simplify the calculation. The inverse of $$\alpha_i^{-\frac{q}{2}}$$

can be defined by $$\left(\frac{1}{\alpha_i^-}\right)^{\frac{q}{2}} = \text{ROUND}\left(\frac{2^q}{\alpha_i^{-\frac{q}{2}}}\right). \tag{5}$$

The multiplier 713 may combine the scale factor $$\alpha_i^{-\frac{q}{2}}$$

of the matrix 718 (equation (4)) with the standard deviation $\sigma^+$ to obtain the obtain the standard deviation 751 $\sigma^-$ at the dynamic propagation stage, which may be modeled as:

$$\sigma_i^{-,h} = \sigma_i^{+,h} \alpha_i^{-\frac{q}{2}} \gg \frac{q}{2}. \tag{6}$$

Module 714 may produce a right shift of q/2 bits and normalize the resulting standard deviation to a precision of h bits.

The cross correlation update 752 at the dynamic propagation stage may be calculated according to:

$$\rho_{ij,n+1}^{-q} = \left(\frac{1}{\alpha_i^-}\right)^{\frac{q}{2}} \left(\frac{1}{\alpha_j^-}\right)^{\frac{q}{2}} Q_{xx,n+1}^{-q} \gg q, \tag{7}$$

where $$\left(\frac{1}{\alpha_i^-}\right)^{\frac{q}{2}},$$

the inverse of the scale factor $$\alpha_i^{-\frac{q}{2}},$$

is defined by equation (5). This function may be symbolized by a function module 715 in FIG. 7. A shift function 717 can scale the cross correlation term into a precision of q bits.

The state dynamic update 753 x̌⁻ may be determined at the dynamic propagation stage and may be calculated at step 610 of the process 600, according the following equation:

$$\check{x}_{n+1}^{-,r-h} = \Lambda^{-,\frac{q}{2}} \Phi_n^t \check{x}_n^{+,r-h} \gg \left(\frac{q}{2} + l\right), \tag{8}$$

where $$\Lambda^{-,\frac{q}{2}} = \text{diag}\left(\left(\frac{1}{\alpha_0^-}\right)^{\frac{q}{2}}, \left(\frac{1}{\alpha_1^-}\right)^{\frac{q}{2}}, \ldots, \left(\frac{1}{\alpha_{N-1}^-}\right)^{\frac{q}{2}}\right). \tag{9}$$

In equation (8), a multiplier 719 may combine the transition matrix t with the normalized state vector $\check{x}^{+,(r-h)}$ with the scale diagonal matrix of $$\Lambda^{-,\frac{q}{2}}$$

(equation (9)). The right shift module 717 may scale the resultant state vector $\check{x}^{-,y-h}$ to r−h bits.

Prior to addressing the measurement update stage, the stability issue at the dynamic propagation stage is discussed below with a first solution to ensure the stability of the cross correlation propagation, such as at step 608 of the process 600. Equation (4) includes an adaptive scale factor $\eta^g$ to approximately calculate the scale factor $$\alpha_i^{-,\frac{q}{2}},$$

which is used for the cross-correlation update $\rho^-$ at the dynamic propagation stage shown in equation (7). The adaptive scale factor $\eta^g$ is helps to bound the cross correlation update $\rho^-$. Bounding the coefficients of the cross-correlation function $\rho_{ij}^-$ within one can help the aggregate predictive filter 42 to be stable and reliable. In particular, equations (4), (5), and (7) described above do not unconditionally guarantee that the coefficients of the cross-correlation function $\rho_{ij}^- \leq 1$. Accordingly, the coefficients of the cross-correlation function $\rho_{ij}^-$ in the dynamic propagation stage may be bounded within an upper limit of $\rho_{LIM}^-$ which can be chosen based on simulation results and experience, for example. In particular, the coefficients of the cross-correlation function $\rho_{ij}^-$ may be bounded according to the equation:

$$\rho_{ij}^- \approx \frac{Q_{xx,ij}}{\eta(1+Q_{xx,ii})\eta(1+Q_{xx,jj})} \leq \rho_{LIM}^- \tag{10}$$

$$\Leftrightarrow \eta^2 \geq \frac{Q_{xx,i,j}}{\rho_{LIM}^-(1+Q_{xx,ii})(1+Q_{xx,jj})}.$$

As shown by equation (10), the variable $\eta^2$ may be associated with a set of a priori elements of the matrices $Q_{xx,ij}$, $Q_{xx,ii}$, $Q_{xx,jj}$, and the upper limit $\rho_{LIM}^-$. The fixed point representation of equation (10) may be defined by the equation:

$$(\eta_{ij}^2)^q \geq \left[ \frac{\left(\frac{2^q}{\rho_{LIM}^-}\right) Q_{xx,ij}^q}{\left(2^{\frac{q}{2}} + \frac{Q_{xx,ii}^q}{2^{\frac{q}{2}}}\right) \left(2^{\frac{q}{2}} + \frac{Q_{xx,jj}^q}{2^{\frac{q}{2}}}\right)} \right], \tag{11}$$

where $2^{\frac{q}{2}-1} \leq \eta_{ij}^{\frac{q}{2}} \leq 2^{\frac{q}{2}}$.

Figure 9:
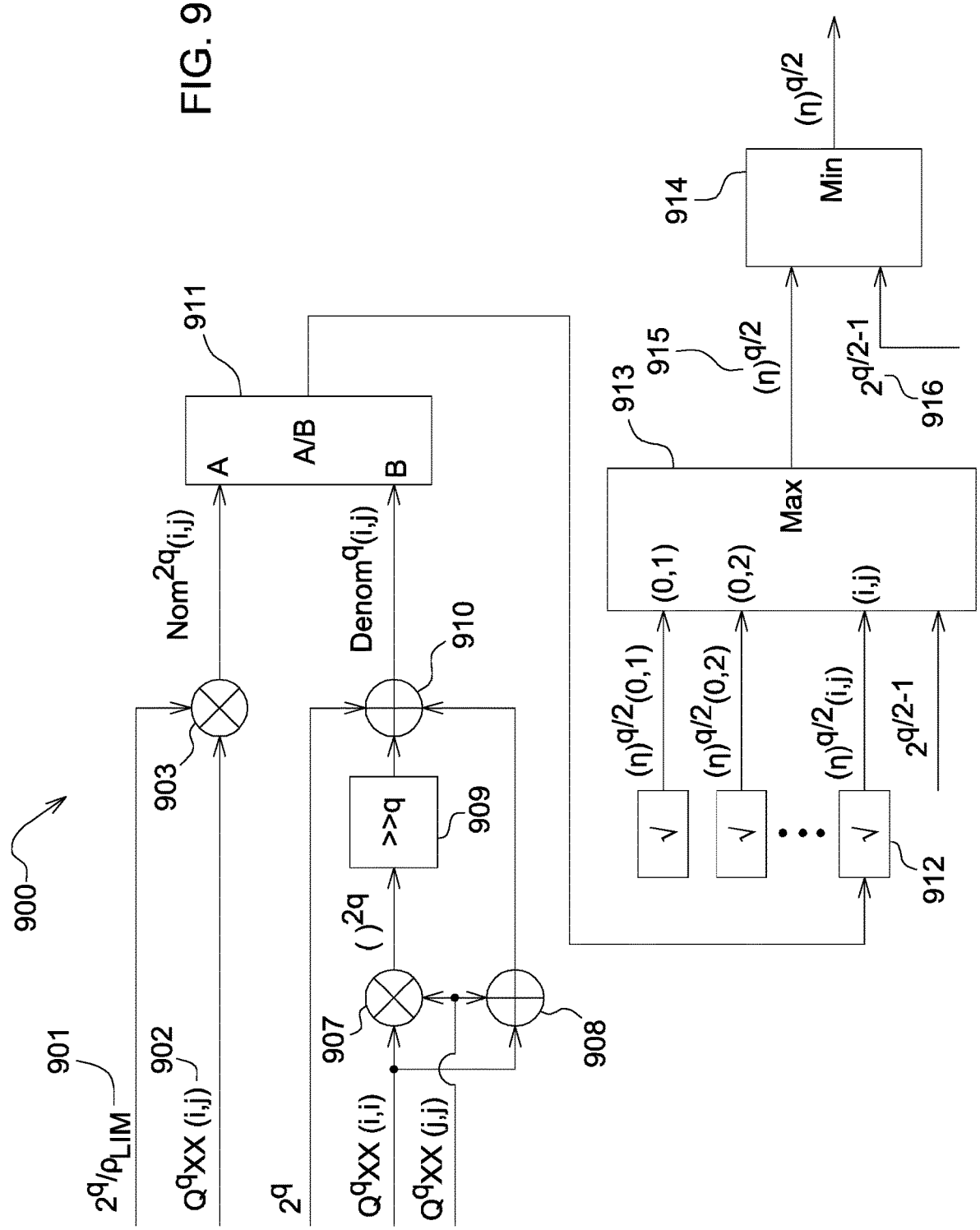
FIG. 9 is a system diagram illustrating the selection of an adaptive scale factor η to bound the cross correlation coefficient within 1 at a dynamic propagation stage of the sigma rho filter, in accordance with some embodiments.

Theoretically, the selection of the adaptive scale factor $\eta^g$ requires the calculation of all the $(\eta_{ij}^2)^q$ for each (i, j) term in the Q matrix. FIG. 9 illustrates the calculation of equation (11) where a multiplier 903 combines the signal 901 and signal 902 to create the numerator of equation (11). The expansion of the denominator of equation (11) may be achieved through an arithmetic module including a multiplier 907, adders 908 and 910, and a right shift module 909, according to one embodiment. A divider 911 can combine the numerator and denominator to create an integer quotient which is processed by a square root module 912 to obtain one element of $$(\eta_{ij})^{\frac{q}{2}}$$

in equation (11). The maximum $$(\eta)^{\frac{q}{2}}$$

915 may be selected by the module 913. In order not to excessively bias the calculation of equation (10), the unit 914 can be used to cap the maximum $$(\eta)^{\frac{q}{2}}$$

utilized for equation (10).

Figure 10:
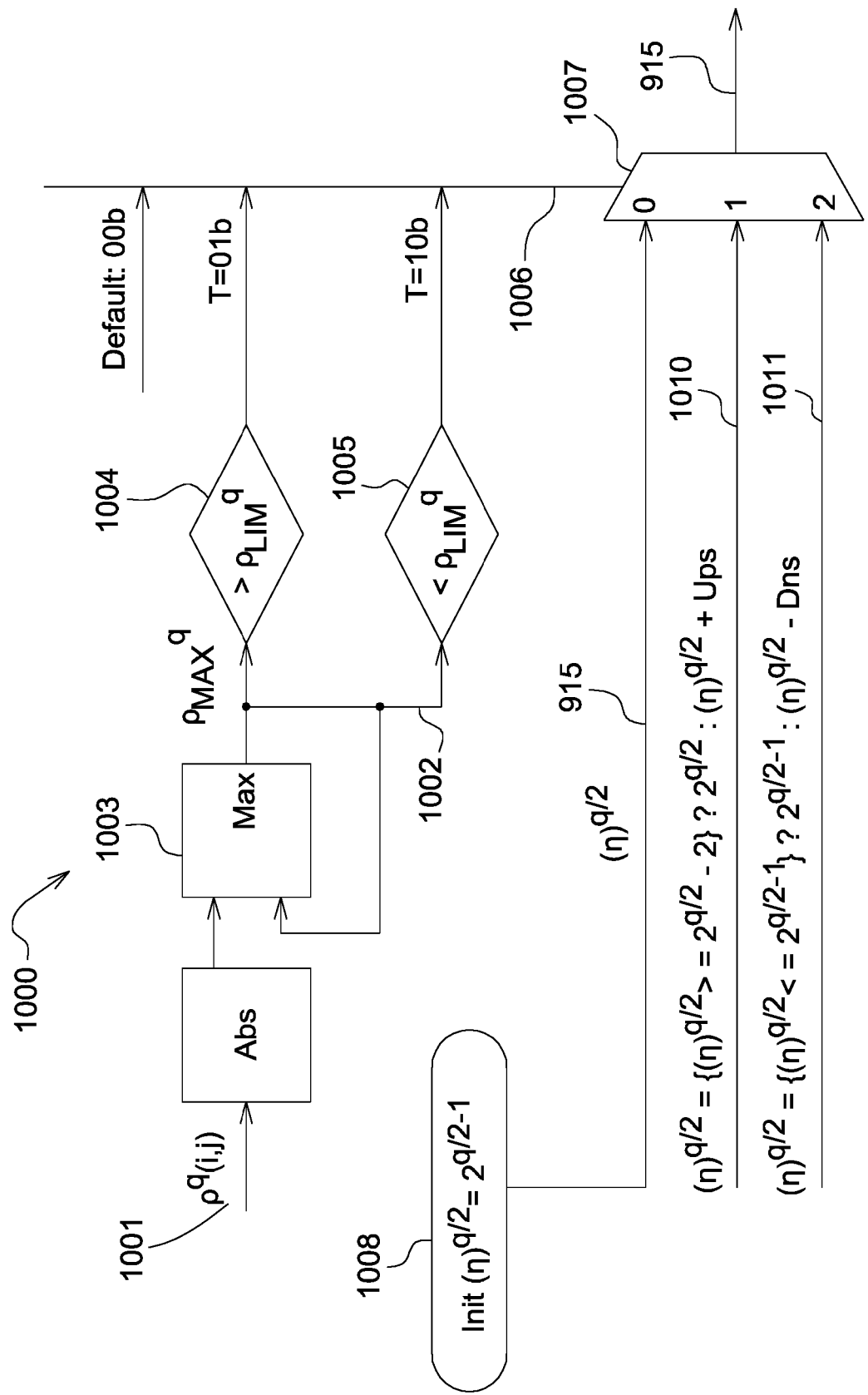
FIG. 10 is a system diagram illustrating a simplified determination of the adaptive scale factor η, in accordance with some embodiments.

The adaptive selection of scale factor $\eta^g$ 915 as shown by FIG. 9 and equation (11) may be difficult to implement in a digital circuit due to the square root module 912. To make the algorithm easier to implement in a digital circuit, FIG. 10 illustrates an alternative algorithm where (1) the scale factor 915 can be initialized through by a default value 1008; and (2) the cross correlation term 1001 may calculated sequentially. Each absolute value of the signal 1001 may be compared with the current maximum cross correlation coefficient 1002, and the greater value can be used to update the signal 1002. Therefore, the signal 1002 may be the maximum absolute cross correlation coefficient, which is compared with a selected threshold $\rho_{LIM}^-$ through the comparators 1004 and 1005. The comparators 1004 and 1005 can generate a selection signal 1006 which controls a multiplexer 1007 to update the scale factor 915 with one of the three candidates 915, 1010, and 1011. If the maximum cross correlation coefficient 1002 is greater than the threshold $\rho_{LIM}^-$, the scale factor 915 may be increased by Ups (i.e., updated using signal 1010); if the maximum cross correlation coefficient 1002 is less than the threshold $\rho_{LIM}^-$, the scale factor 915 may be decreased by Dns (i.e., updated using signal 1011); otherwise, the current scale factor 915 may be kept constant.

At step 612 of the process 600, the measurement may start with building an updated observation matrix 745 with a precision of h bits, which is modeled by:

$$H_i^h = H_{B,i}^t \sigma_i^{-,h} \tag{12}$$

where i=0, 1, . . . , N−1.

Equation (12) may be realized using a function module 720 and a right shift 721 of FIG. 7. In equation (12), the observation matrix $H_i^h$ may be computed based on a base observation matrix 754 $H_{B,i}^t$, which is a constant matrix with terms relating to shift, velocity, and acceleration.

At step 614, the innovation signal 747 may be calculated which denotes the deviation of the system predicted error 746 against the discriminator observed error signal 755. The system predicted measurement $\hat{y}_{n+1}{}^r$ may then be determined with the unit 734, according to the equation:

$$\hat{y}_{n+1}{}^r = H^h \hat{x}_{n+1}{}^{-r,-h} \qquad (13).$$

Accordingly, the innovation signal $V_{obs}{}^r$ 747 may be a combination of the predicted error $\hat{y}_{n+1}{}^r$ 746 from equation (13) and the discriminator observed error signal $y_{n+1}{}^r$ 755, and may be defined as:

$$V_{obs}{}^r = y_{n+1}{}^r - \hat{y}_{n+1}{}^r \qquad (14).$$

At step 616 of the process 600, the measurement update for the standard deviation and cross-correlation functions may be determined by the observation matrix $H_i{}^h$ from equation (12), $\sigma^h$ from equation (6), and $\rho^q$ from equation (7). A weighted standard deviation $D_i{}^q$ may be calculated according to the equation:

$$D_i{}^q = (\Sigma_{k=0}^{N-1} H_k{}^h \rho_{ik}{}^{-q}) >> h \qquad (15),$$

which is a summation of the product of the observation matrix 745 $H_i{}^h$ and the dynamic update for the cross-correlation function $\rho^-$ using a function unit 722, followed by a symmetric truncation of h bits through a scale factor unit 723.

A sum $\Omega^2$ of the weighted standard deviation may be calculated by:

$$(\Omega^2)^q = (\Sigma_{k=0}^{N-1} H_k{}^h D_i{}^q) >> h + R^q \qquad (16),$$

which is a summation of the product of the observation matrix $H_i{}^h$ and the weighted standard deviation $D_i{}^q$ using a function unit 724, followed by a symmetric truncation of h bits through a scale factor unit 725. The output of the scale factor unit 725 may be added by an user-defined observation noise matrix $R^q$ to achieve the sum $(\Omega^2)^q$.

The Kalman gain of the aggregated predictive filter 42 may be calculated using the observation matrix $H_i{}^h$ from equation (12) and the dynamic update for the cross-correlation function $\rho^-$, according to the equation:

$$K_i{}^h = (\Sigma_{k=0}^{N-1} H_k{}^h \rho_{ik}{}^{-q}) >> q \qquad (17).$$

Equation (17) may calculate the Kalman gain by a summation of the product of the observation matrix $H_i{}^h$ and the dynamic update for the cross-correlation function $\rho^-$, followed by a symmetric truncation of q bits. The operations of equation (17) may be performed by a function unit 736.

In order to discuss the standard deviation and cross correlation updates at the measurement update stage, some intermediate calculations may be derived from equations (15) and (16) to define the variable $(\beta_i{}^2)^q$, which is the key parameter to propagate the cross correlation and standard deviation at the measurement update stage, such as at step 618 of the process 600. Additionally, the range of the variable $(\beta_i{}^2)^q$ may play an important role for the stability of the cross correlation and standard deviation propagation. The variable $(\beta_i{}^2)^q$ may be defined according to the equation:

$$(\beta_i^2)^q = \mathrm{ROUND}\left(\frac{D_i^q D_i^q}{(\Omega^2)^q}\right), \qquad (18)$$

which may be performed by a function block 726 in FIG. 7.

At step 620 of the process 600, and as will be shown in equation (21) described below, $$\frac{1}{\sqrt{1-\beta_i^2}}$$

is used to propagate the cross correlation. To improve the stability of $$\frac{1}{\sqrt{1-\beta_i^2}}$$

in fixed point mode, the variable $\beta_i{}^2$ is required to be less than 1 (to make the square root calculation valid) but not too close to 1 (to make the inverse calculation stable). Therefore, a rescale parameter $\gamma$ can be introduced to bound the variable $\beta_i{}^2$ within an appropriate range. The fixed point version of the rescale of the variable $(\beta_i{}^2)^q$ may be defined by:

$$(\beta_i^2)^q = \mathrm{ROUND}(\gamma(\beta_i^2)^q) \qquad (19),$$

which may be performed by a rescale module 727.

An arbitrary threshold $(\beta_{LIM}{}^2)^q$ may be pre-defined to instantly select the rescale parameter $\gamma$ that can bound all $(\beta_i{}^2)^q$ (i=1, 2, ..., N) within $(\beta_{LIM}{}^2)^q$. The rescale parameter $\gamma$ may be selected to bound $(\beta_i{}^2)^q$ to less than one during the measurement update stage, according to the equation:

$$\gamma = \frac{(\beta_{LIM}^2)^q}{\max\{(\beta_i^2)^q\}}. \qquad (20)$$

Figure 11:
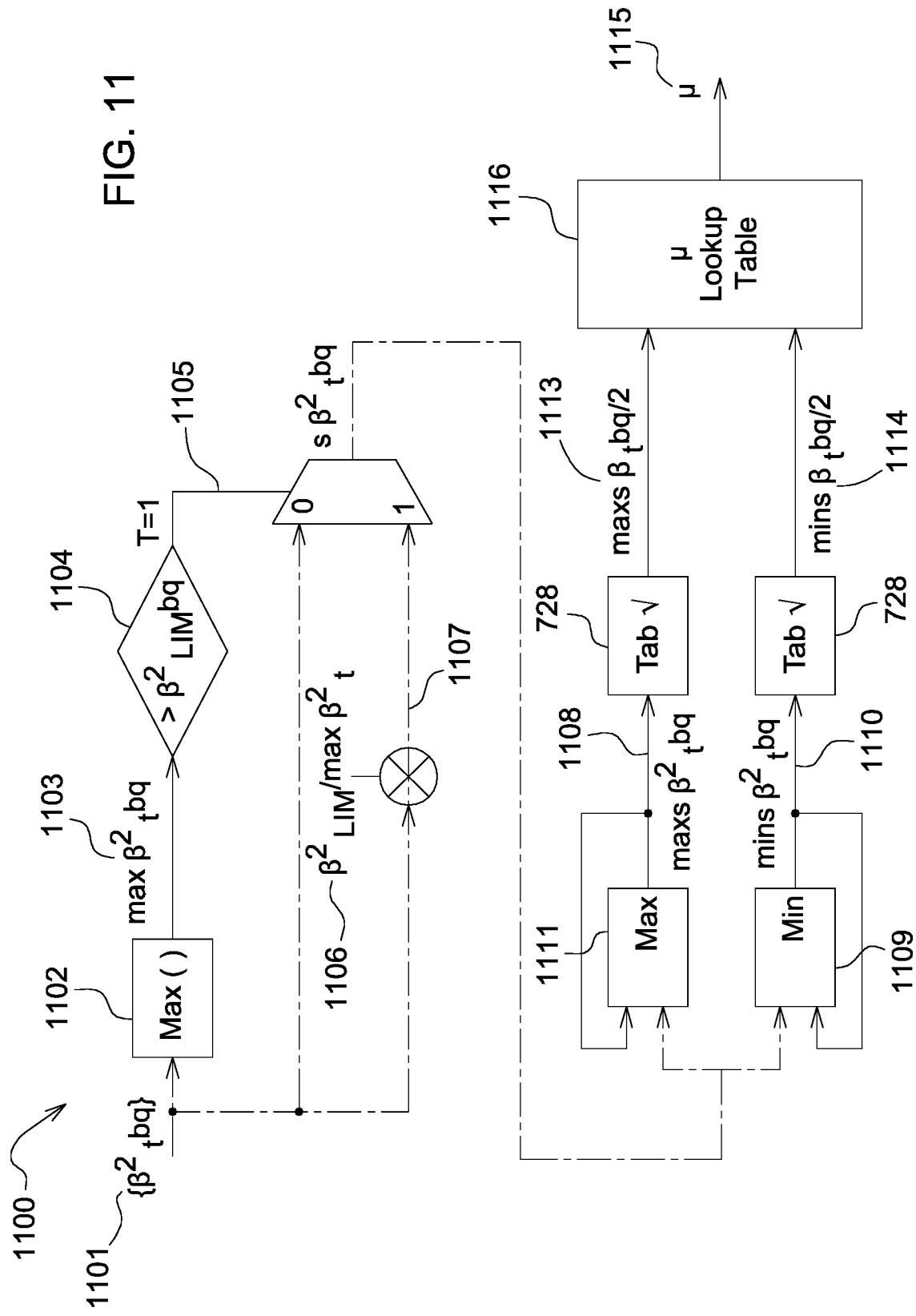
FIG. 11 is a system diagram illustrating a method to control the range of a parameter β which influences the standard deviation and cross correlation updates at the measurement update stage of the sigma rho filter, and the first solution of an adaptive selection of an adaptive scale factor μ to control the stability of the cross correlation update, in accordance with some embodiments.

In particular, equation (20) may calculate the rescale parameter $\gamma$ by dividing the predetermined upper limit $(\beta_{LIM}{}^2)^q$ by a maximum of the variable $(\beta_i{}^2)^q$. FIG. 11 illustrates the rescale computation of equation (19) where the maximum unit 1102 selects the maximum value from the vector of $\{(\beta_i{}^2)^q\}$ 1101; and the comparator 1104 tests the condition of $(\beta_{max}{}^2)^q > (\beta_{LIM}{}^2)^q$. If it is true, the rescale parameter $\gamma$ may be calculated based on equation (20) and the vector of $\{\beta_i{}^2)^q\}$ may be scaled accordingly. Otherwise, the rescale parameter $\gamma=1$ and the vector $\{(\beta_i{}^2)^q\}$ can be used directly.

At step 622 of the process 600, the measurement update of the standard deviation function $\sigma_i{}^+$ may be calculated by the function module 737 and the shift module 738 according to the equation:

$$\sigma_i^{+,h} = \sigma_i^{-,h} \alpha_i^{+,\frac{q}{2}} >> \frac{q}{2}, \text{ where} \qquad (21)$$

$$\alpha_i^{+,\frac{q}{2}} = \left(\frac{\sigma_i^{+,h}}{\sigma_i^{-,h}}\right)^{\frac{q}{2}} \qquad (22)$$

$$= \left(\sqrt{1-\beta_i^2}\right)^{\frac{q}{2}}$$

$$= \sqrt{2^q - (\beta_i^2)^q}$$

$$\approx 2^{\frac{q}{2}} - \mu^v(\beta_i^2)^q >> \left(v + \frac{q}{2}\right).$$

The selection of a scale factor $\mu^v$ with v bits precision in equation (22) is important to bound the cross correlation within 1. An analysis and solution related to this selection is described below. By assuming an appropriate scale factor $\mu^v$ is already selected, the function module 730 and the right shift module 731 may perform the calculation of equation (22).

Equation (21) may calculate the measurement update of the standard deviation function 701 $\sigma_i^+$ based on multiplying the dynamic update of the standard deviation function 751 $\sigma^-$ and the variable $$\alpha_i^{+,\frac{q}{2}}$$

from equation (22), followed by a symmetric truncation of $$\frac{q}{2}$$

bits.

The measurement update of the cross-correlation function 702 $\rho_{ij}^+$ may be calculated according to the equation:

$$\rho_{ij}^{+,q} = \left(\frac{1}{\alpha_i^+}\right)^{\frac{q}{2}}\left(\frac{1}{\alpha_j^+}\right)^{\frac{q}{2}}(\rho_{ij}^{-,q} - \beta_i^{\frac{q}{2}}\beta_j^{\frac{q}{2}}) >> q, \text{ where} \quad (23)$$

$$\left(\frac{1}{\alpha_i^+}\right)^{\frac{q}{2}} := \text{ROUND}\left(\frac{2^q}{\alpha_i^{+,\frac{q}{2}}}\right). \quad (24)$$

In particular, $$\beta_i^{\frac{q}{2}}$$

in equation (23) may be obtained through looking up a square root table 728 based on the input of $(\beta_i^2)^q$. A square root table is a reasonable implementation as $(\beta_{LIM}^2)^q$ is the maximum value that $(\beta_i^2)^q$ can reach. A function unit 732 may inverse $$\alpha_i^{+,\frac{q}{2}}$$

based on equation (24), which is combined with $\rho_{ij}^{-,q}$ and $$\beta_i^{\frac{q}{2}}$$

through equation (23). The output of the function unit 732 is symmetrically truncated by q bits using a scale factor unit 733.

Before describing the state propagation at the measurement update stage, the selection of the scale factor $\mu$ to compute $$\left(\sqrt{1-\beta_i^2}\right)^{\frac{q}{2}}$$

in equation (22) (described above) is important to guarantee: (1) the stability of standard deviation propagation (equation (22)) such that $(\beta_i^2)^q \leq (\beta_{LIM}^2)^q$, $\forall i$; and (2) the stability of cross correlation propagation (equation (23)) as the selection of $\mu$ impact the calculation of $$\left(\frac{1}{\alpha_i^+}\right)^{\frac{q}{2}},$$

thus affecting the range of cross correlation at measurement update.

In particular, the measurement update of the cross-correlation function $\rho_{ij}^+$ in equation (23) may be calculated at floating point according to the equation:

$$\rho_{ij}^+ = \frac{\rho_{ij}^- - \beta_i\beta_j}{\sqrt{1-\beta_i^2}\sqrt{1-\beta_j^2}} \quad (25)$$

$$\approx \frac{\rho_{ij}^- - \beta_i\beta_j}{(1-\mu_{ij}\beta_i^2)(1-\mu_{ij}\beta_j^2)}.$$

Equation (25) can calculate the measurement update of the cross-correlation function $\rho_{ij}^+$ based on the dynamic update of the cross-correlation function $\rho^-$ and the variable $\beta_i^2$ defined by equation (18). As can be seen in equation (25), the adaptive scale factor $\mu$ can be determined to ensure that the measurement update of the cross-correlation function $\rho_{ij}^+$ is bounded within one, due to the approximation to the square root in the denominator of equation (25).

In one embodiment, to guarantee that the measurement update of the cross-correlation function $\rho_{ij}^+<1$, equation (25) may be equivalent to the following optimization problem as defined by:

$$\mu = \arg\min_{i,j}\{\mu_{ij}\}$$

st.

$$\forall i,j \in [0,N-1],$$

$$\beta_i^2\beta_j^2\mu_{ij}^2 - (\beta_i^2+\beta_j^2)\mu_{ij} + \beta_i\beta_j \geq 0 @ \rho_{ij}^- = 1 \quad (26).$$

The solution to the inequality of the parabola defined by equation (26) is $$\mu_{ij} = \begin{cases} \mu_{ij}^1 & \text{if } 0 \leq \mu_{ij}^1 < 1 \\ 0 & \text{if } \mu_{ij}^1 < 0 \\ 1 & \text{if } \mu_{ij}^1 \geq 1 \end{cases}, \text{ where} \quad (27)$$

$$\mu_{ij}^1 = \frac{B - \sqrt{B^2 - 4AC}}{2A}, \quad (28)$$

$$B^2 - 4AC = (\beta_i^2+\beta_j^2)^2 - 4\beta_i^3\beta_j^3 \geq 4\beta_i^2\beta_j^2 - 4\beta_i^3 4\beta_j \geq 0, \text{ and} \quad (29)$$

$$\begin{cases} A = \beta_i^2\beta_j^2 \geq 0 \\ B = \beta_i^2 + \beta_j^2 \geq 0 \\ C = \beta_i\beta_j \geq 0 \end{cases} \quad (30)$$

Figure 13:
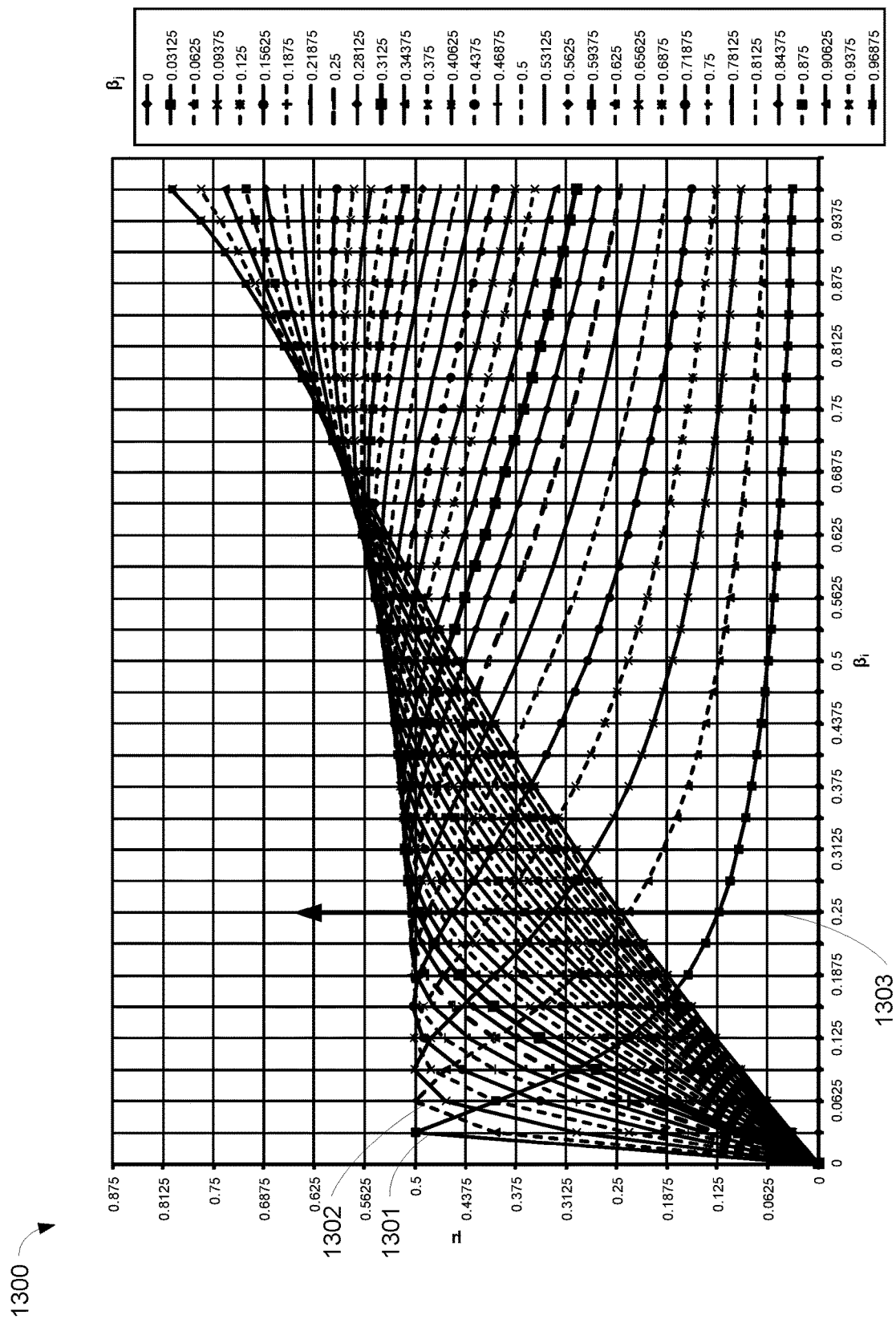
FIG. 13 is a graph showing a solution to a convex optimal problem from which the first solution illustrated in FIG. 11 is derived.

A numerical solution of the adaptive scale factor $\mu$ in equation (27) can be based on a pair of input $(\beta_i,\beta_j)$ to be evaluated, where $\beta_i$ ranges from 0 to 1 with a step of $\frac{1}{32}$ and $\beta_j$ is selected from 0 to 1 with a step of $\frac{1}{32}$. FIG. 13 illustrates the numerical results in a graph 1300, where curve 1301 depicts the adaptive scale factor $\mu$ based on equation (27) by fixing $\beta_i=\frac{1}{32}$ and sweeping $\beta_j=[0,1]$, and curve 1302 depicts the adaptive scale factor $\mu$ by fixing $\beta_i=\frac{2}{32}$. Comparing the curves 1301 and 1302, given a fixed $\beta_j$ (as denoted by vertical line 1303) where $\beta_j > \beta_i$, the less $\beta_i$ is, the less the solution of the adaptive scale factor $\mu$ is. Therefore, a practical solution to select the adaptive scale factor $\mu$ suitable for any pair of $(\beta_i, \beta_j)$ per equation (26) can be realized through two steps: (1) finding the minimum $\beta$ denoted as $\beta_{min}$ and the maximum $\beta$ denoted as $\beta_{max}$; and (2) finding the solution of the adaptive scale factor $\mu$ to the pair of $(\beta_{min}, \beta_{max})$. Based on the above, this is the minimum solution that satisfies the argument of equation (26).

In an embodiment, FIG. 11 illustrates the adaptive scale factor $\mu$ selection process described above, where the unit 1111 remembers the maximum $\beta_{max}$ 1108 within the vector $\{\beta_i\}$, and the unit 1109 remembers the minimum $\beta_{min}$ 1110 within the vector $\{\beta_i\}$. As described above, a square root table 728 (shown in FIG. 7) is a reasonable and convenient implementation to perform the square root operation. The resulting pair $$(\beta_{min}^{\frac{q}{2}}, \beta_{max}^{\frac{q}{2}})$$

may be the entry for a two-dimensional lookup table 1115 to obtain the minimum argument of the adaptive scale factor $\mu$ described by equation (26).

Figure 12:
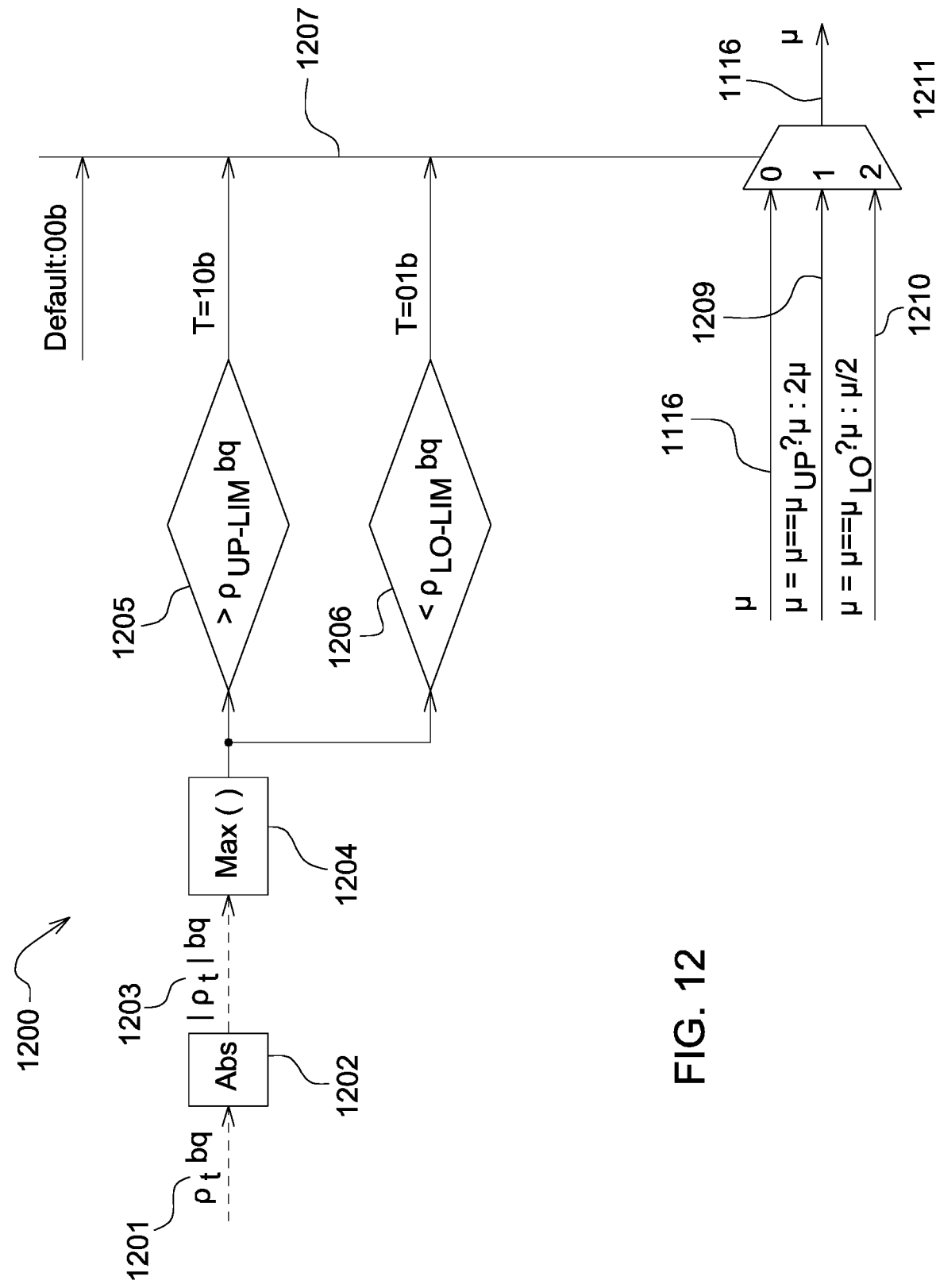
FIG. 12 is a system diagram illustrating a second solution to select the adaptive scale factor μ for the stability of the cross correlation update at the measurement update stage of the sigma rho filter, in accordance with some embodiments.

In another embodiment, equation (25) implies that by lowering the range of the adaptive scale factor $0 \le \mu \le 1$, the cross correlation $\rho^+$ gets smaller. Thus, another method of adaptively adjusting the adaptive scale factor $\mu$ is illustrated in FIG. 12 using a halve-double method, such as at step 624 of the process 600. The unit 1202 may take the absolute value of a vector $\{\rho_{ij}^+\}$, then a selector 1204 may select the maximum $\rho_{max}^+$ from vector 1203. A comparator 1205 can compare $\rho_{max}^+$ with an upper limit $\rho_{UP\text{-}LIM}^+$ and a comparator 1206 may compare $\rho_{max}^+$ with a lower limit $\rho_{LO\text{-}LIM}^+$. The comparators 1205, 1206 may create a selection signal 1207 which determines whether the adaptive scale factor $\mu$ 1116 is kept constant, or is doubled 1209 or halved 1210.

At step 626 of the process 600, the state propagation $\check{x}_{i,n+1}^{+,j\text{-}h}$ may be determined to complete the measurement update stage, according to the equation:

$$\check{x}_{i,n+1}^{+,r\text{-}h} = \left(\frac{1}{\alpha_i^+}\right)^{\frac{q}{2}} \check{x}_{i,n+1}^{-,r\text{-}h} \gg \frac{q}{2} + \left\{\left[\frac{K_i^h V_{obs}^r}{\sigma_{\varphi cr}^{+,h}}\right] \gg h\right\}. \quad (31)$$

In one embodiment, a function unit 739 may calculate $$\left[\frac{K_i^h V_{obs}^r}{\sigma_{\varphi cr}^{+,h}}\right]$$

followed by a scale factor unit 740 to obtain the intermediate results of the second half of equation (31). A function unit 741 may calculate $$\left(\frac{1}{\alpha_i^+}\right)^{\frac{q}{2}} \check{x}_{i,n+1}^{-,r\text{-}h}$$

followed by a shift unit 742 to obtain the first half of equation (31). The two parts may be added to generate the state measurement update signal 703.

The receiver disclosed in this document is well-suited for: (1) utilizing an aggregate predictive fixed point sigma rho filter to improve real time carrier and code tracking of received signals; and (2) implementing the fixed point sigma rho filter using adaptive strategies to control the range of the cross correlation term to ensure the stability and reliability of the filter.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method for processing a composite received signal for satellite navigation, comprising:
   down-converting, with a receiver front end, the composite received signal comprising a plurality of carrier signals;
   converting, with an analog-to-digital converter, the down-converted composite received signal to a digital composite received signal;
   generating, with a plurality of signal generators, a plurality of local reference signals and a plurality of local reference ranging codes based on carrier corrective control data and code corrective control data based on feedback from an aggregate predictive filter, wherein the plurality of local reference carrier signals and the plurality of local reference ranging codes are each associated with one of the plurality of carrier signals;
   determining, with correlators of a plurality of receiver modules, a plurality of correlations of the digital composite received signal to each of the plurality of local reference carrier signals and the plurality of local reference ranging codes, wherein each of the plurality of correlations comprises an in-phase correlation and a quadrature correlation and is associated with one of the plurality of carrier signals; and
   estimating, with the aggregate predictive filter, the carrier corrective control data and the code corrective control data based on the plurality of correlations.

2. The method of claim 1, wherein estimating the carrier corrective control data and the code corrective control data comprises estimating the carrier corrective control data and the code corrective control data at a reference frequency based on the plurality of correlations, and wherein the carrier corrective control data and the code corrective control data represent a correction to a range estimation between the receiver and a satellite.

3. The method of claim 2:
further comprising scaling the carrier corrective control data and the code corrective control data at the reference frequency to scaled carrier corrective control data and scaled code corrective control data at a frequency of each of the plurality of carrier signals;
wherein generating the plurality of local reference carrier signals and the plurality of local reference ranging codes comprises generating the plurality of local reference carrier signals and the plurality of local reference ranging codes based on the scaled carrier corrective control data and the scaled code corrective control data.

4. The method of claim 2:
wherein each of the plurality of correlations is for a frequency of each of the plurality of carrier signals;
further comprising weighting each of the plurality of correlations based on a signal quality metric.

5. The method of claim 4, wherein the signal quality metric comprises one or more of a signal-to-noise ratio or a moving average of the signal-to-noise ratio over a sliding window.

6. The method of claim 2:
wherein the carrier corrective control data comprises carrier corrective control data at the reference frequency and carrier corrective control data at a frequency of each of the plurality of carrier signals; and
wherein the code corrective control data comprises code corrective control data at the reference frequency and code corrective control data at a frequency of each of the plurality of carrier signals;
wherein estimating the carrier corrective control data and the code corrective control data comprises:
determining a carrier tracking error at the reference frequency from the plurality of correlations;
determining a code tracking error at the reference frequency from the plurality of correlations;
determining the carrier corrective control data at the reference frequency and the code corrective control data at the reference frequency, based on the carrier tracking error and the code tracking error; and
estimating the carrier corrective control data at a frequency of each of the plurality of carrier signals and the code corrective control data at a frequency of each of the plurality of carrier signals, based on the carrier tracking error and the code tracking error.

7. The method of claim 1, further comprising estimating one or more of a position or a velocity based on a phase of local reference carrier signal and a phase of the local reference ranging code.

8. The method of claim 1, wherein estimating the carrier corrective control data and the code corrective control data comprises estimating the carrier corrective control data and the code corrective control data with a fixed-point sigma rho filter, wherein the carrier corrective control data and the code corrective control data comprise one or more of an estimated code phase, an estimated carrier phase at a reference frequency, a Doppler shift, a rate of change of the Doppler shift, a strength of the plurality of carrier signals, or an amplitude of the plurality of carrier signals.

9. The method of claim 1, wherein estimating the carrier corrective control data and the code corrective control data with the fixed-point sigma rho filter comprises estimating the carrier corrective control data and the code corrective control data using a dynamic propagation stage and a measurement update stage of the fixed-point sigma rho filter, based on a standard deviation function (sigma) and a cross-correlation function (rho).

10. The method of claim 9, wherein estimating the carrier corrective control data and the code corrective control data using the dynamic propagation stage and the measurement update stage comprises dynamically selecting an adaptive scale factor $\eta$ to bound coefficients of the cross-correlation function within one during the dynamic propagation stage, based on previous coefficients of the cross-correlation function.

11. The method of claim 9, wherein estimating the carrier corrective control data and the code corrective control data using the dynamic propagation stage and the measurement update stage comprises selecting a rescale parameter $\gamma$ to limit a parameter $\beta$ to less than one during the measurement update stage, based on a predetermined upper limit.

12. The method of claim 9, wherein estimating the carrier corrective control data and the code corrective control data using the dynamic propagation stage and the measurement update stage comprises determining an adaptive scale factor $\mu$ to limit coefficients of the cross-correlation function within one during the measurement update stage, wherein the adaptive scale factor is selected from a plurality of predetermined scale factors stored in a lookup table, based on indices of $\beta_i$ and $\beta_j$.

13. The method of claim 9, wherein estimating the carrier corrective control data and the code corrective control data using the dynamic propagation stage and the measurement update stage comprises determining an adaptive scale factor $\mu$ to limit coefficients of the cross-correlation function within one during the measurement update stage, comprising:
doubling the adaptive scale factor until a predetermined maximum value is reached, if a maximum coefficient of the cross-correlation function is greater than a predetermined upper threshold; and
halving the adaptive scale factor, if the maximum coefficient of the cross-correlation function is less than a predetermined lower threshold.

14. The method of claim 9, wherein the fixed-point sigma-rho filter is implemented as a phase-locked loop (PLL).

15. The method of claim 1, wherein the plurality of carrier signals comprises a first carrier (L1), a second carrier (L2), and a third carrier (L5).

16. The method of claim 1:
further comprising filtering the digital composite received signal into a plurality of filtered carrier signals that are each associated with a different carrier signal within the digital composite received signal;
wherein determining the plurality of correlations comprises determining the correlation of one of the plurality of filtered carrier signals to the local reference carrier signals and the local reference ranging code.

* * * * *